United States Patent
Ho et al.

(10) Patent No.: US 10,666,732 B2
(45) Date of Patent: May 26, 2020

(54) SYSTEMS AND METHODS TO PROVIDE DIGITAL AMENITIES FOR LOCAL ACCESS

(75) Inventors: Chi Fai Ho, Palo Alto, CA (US); Peter Tong, Mountain View, CA (US)

(73) Assignee: IPLContent, LLC, Mountain View, CA (US)

( * ) Notice: Subject to any disclaimer, the term of this patent is extended or adjusted under 35 U.S.C. 154(b) by 0 days.

(21) Appl. No.: 13/405,366

(22) Filed: Feb. 27, 2012

(65) Prior Publication Data

US 2012/0246313 A1   Sep. 27, 2012

Related U.S. Application Data

(60) Provisional application No. 61/488,798, filed on May 23, 2011, provisional application No. 61/448,662, filed on Mar. 21, 2011.

(51) Int. Cl.
*H04L 29/08* (2006.01)
*H04W 4/021* (2018.01)

(52) U.S. Cl.
CPC .............. *H04L 67/12* (2013.01); *H04L 67/16* (2013.01); *H04L 67/34* (2013.01); *H04W 4/021* (2013.01)

(58) Field of Classification Search
CPC .. G06Q 20/32; G06Q 20/325; G06Q 30/0261; G06Q 10/087; G06Q 30/0641; G06Q 10/08; G06Q 10/083; G06Q 20/12; G06Q 30/0601; G06Q 30/0633; G06Q 30/0635; G06Q 30/02; G06Q 30/0241; G06Q 30/0254; G06Q 30/0267; G06Q 30/06; G06Q 30/0623; G06Q 30/0639; G06Q 20/123; G06Q 30/0269; G06Q 30/0255; G06Q 30/0257; G06Q 30/00; G06Q 30/0242; G06Q 30/0277; G06Q 20/04; G06Q 20/10; G06Q 30/0251; G06Q 40/02; H04L 63/10; H04L 63/1416; H04L 29/08558; H04L 41/0813; H04L 67/18;
(Continued)

(56) References Cited

U.S. PATENT DOCUMENTS 7,130,890 B1 *  10/2006  Kumar ................ H04L 67/2847
                                                    707/999.01
7,545,271 B2 *   6/2009  Jalkanen ................. G06F 21/10
                                                        340/5.82
(Continued)

OTHER PUBLICATIONS

"Cisco Connected Stadium Wi-Fi for Sports and Entertainment Venues," Cisco White Paper © 2011 Cisco, pp. 1-8.

*Primary Examiner* — Tonia L Dollinger
*Assistant Examiner* — Linh T. Nguyen

(57) ABSTRACT

One embodiment includes a network apparatus at a store for allowing digital amenities to be accessed at the store by a mobile device of a user. The network apparatus includes a network interface, a storage module to keep digital amenities and a computing module. The network interface can be designed to couple to the mobile device at the store, and to a computing device outside the store. The network interface can be designed to recognize the mobile device at the store based on a piece of software related to the store in the mobile device. The computing module can be designed to help the mobile device to access a first digital amenity from the storage module in view of the piece of software. Based on the access, a second digital amenity from the computing device can be pre-stored at the storage module.

36 Claims, 16 Drawing Sheets

(58) Field of Classification Search
CPC .............. H04L 67/04; H04L 65/1016; H04L 29/12066; H04L 67/1036; H04L 67/2847; H04L 67/306; H04L 145/745; H04L 61/1511; H04L 67/1002; H04L 67/2842; H04L 67/141; H04L 67/20; H04L 67/303; H04L 9/321; H04L 67/26; H04L 45/745; G06F 8/65; G06F 21/10; G06F 17/30902; G06F 12/0875; G06F 12/0888; G06F 17/2288; G06F 17/30876; H04W 12/08; H04W 88/08
USPC ....... 709/225, 231, 232, 217, 219, 203, 238, 709/201, 245, 206; 705/26.1, 14.64, 26.9, 705/14.49, 14.55, 14.58; 707/E17.001, 707/E17.009, E17.014, E17.032, 723, 707/769, 999.003, 999.006, 999.2
See application file for complete search history.

(56) References Cited

U.S. PATENT DOCUMENTS

| | | | | |
|---|---|---|---|---|
| 7,555,542 | B1* | 6/2009 | Ayers | H04L 29/06 709/220 |
| 7,653,574 | B2* | 1/2010 | Harper et al. | 705/27.1 |
| 8,122,257 | B2* | 2/2012 | Rhoads et al. | 713/176 |
| 8,286,229 | B2* | 10/2012 | Bodin | G06F 21/10 705/64 |
| 8,554,640 | B1* | 10/2013 | Dykstra et al. | 705/26.7 |
| 8,618,717 | B2* | 12/2013 | Mocanu et al. | 370/310 |
| 2002/0010798 | A1* | 1/2002 | Ben-Shaul | G06F 17/3089 709/247 |
| 2002/0069261 | A1* | 6/2002 | Bellare | G06F 17/3089 709/218 |
| 2002/0157092 | A1* | 10/2002 | Kitsukawa | H04L 67/325 725/9 |
| 2002/0174228 | A1* | 11/2002 | Kanemaki et al. | 709/226 |
| 2003/0078986 | A1* | 4/2003 | Ayres | H04L 29/06 709/217 |
| 2004/0093274 | A1* | 5/2004 | Vanska | G01C 21/20 705/26.7 |
| 2004/0143652 | A1* | 7/2004 | Grannan et al. | 709/223 |
| 2006/0082809 | A1* | 4/2006 | Loukipoudis et al. | 358/1.15 |
| 2006/0129537 | A1* | 6/2006 | Torii | 707/999 |
| 2006/0165060 | A1* | 7/2006 | Dua | 370/352 |
| 2006/0277271 | A1* | 12/2006 | Morse et al. | 709/217 |
| 2006/0288119 | A1* | 12/2006 | Kim | H04L 67/2814 709/238 |
| 2007/0136794 | A1* | 6/2007 | Chin | H04L 63/0807 726/5 |
| 2007/0173236 | A1* | 7/2007 | Vishwanathan et al. | 455/414.1 |
| 2007/0282703 | A1* | 12/2007 | Sharpe et al. | 705/26 |
| 2008/0004888 | A1* | 1/2008 | Davis et al. | 705/1 |
| 2008/0059884 | A1* | 3/2008 | Ellis et al. | 715/721 |
| 2008/0097858 | A1* | 4/2008 | Vucina et al. | 705/14 |
| 2008/0109888 | A1* | 5/2008 | Ullah | 726/7 |
| 2008/0162670 | A1* | 7/2008 | Chapweske | G06F 8/65 709/219 |
| 2008/0228864 | A1* | 9/2008 | Plamondon | G06F 17/30902 709/203 |
| 2008/0235400 | A1* | 9/2008 | Slocombe | H04L 29/06 709/245 |
| 2009/0037207 | A1* | 2/2009 | Farah | G06Q 50/00 705/301 |
| 2009/0257376 | A1* | 10/2009 | Dhanapal et al. | 370/328 |
| 2009/0264070 | A1* | 10/2009 | Lim | G06Q 30/0261 455/41.2 |
| 2010/0174655 | A1* | 7/2010 | Butler et al. | 705/80 |
| 2010/0275267 | A1* | 10/2010 | Walker | G07F 9/023 726/26 |
| 2011/0029438 | A1* | 2/2011 | Wong et al. | 705/80 |
| 2011/0087602 | A1* | 4/2011 | Rutman | G06Q 20/1235 705/52 |
| 2011/0099070 | A1* | 4/2011 | Eliason | G06Q 30/00 705/14.58 |
| 2011/0206023 | A1* | 8/2011 | Cohn et al. | 370/338 |
| 2011/0265126 | A1* | 10/2011 | Rouse et al. | 725/61 |
| 2011/0303741 | A1* | 12/2011 | Bolton | G06Q 10/087 235/375 |
| 2011/0320293 | A1* | 12/2011 | Khan | G06Q 20/0457 705/16 |
| 2012/0088487 | A1* | 4/2012 | Khan | H04W 4/001 455/418 |
| 2012/0198020 | A1* | 8/2012 | Parker | H04W 12/08 709/217 |
| 2013/0179199 | A1* | 7/2013 | Ziskind | G06F 21/10 705/5 |
| 2013/0262628 | A1* | 10/2013 | Sivasubramanian | H04L 61/1511 709/217 |
| 2013/0297739 | A1* | 11/2013 | Faihe | G06Q 10/101 709/217 |

* cited by examiner

```
                                                        ~ 400

Recognize mobile device at store  ~ 402
                         |
                         v
          Allow mobile device to access
                1st digital amenity        ~ 404
                         |
                         v
            Determine if mobile device
          has accessed 1st digital amenity ~ 406
                         |
                        Yes
                         v
             Access 2nd digital amenity
                from outside device        ~ 408
                         |
                         v
             Store 2nd digital amenity     ~ 410
```

Figure 8

SYSTEMS AND METHODS TO PROVIDE DIGITAL AMENITIES FOR LOCAL ACCESS

CROSS REFERENCE TO RELATED APPLICATIONS

This application claims benefit of:
(I) U.S. Provisional Patent Application No. 61/448,662, filed on Mar. 21, 2011, entitled "Systems and methods to provide digital amenities for local stores," which is hereby incorporated herein by reference; and
(II) U.S. Provisional Patent Application No. 61/488,798, filed on May 23, 2011, entitled "Systems and methods to provide digital amenities for local stores," which is hereby incorporated herein by reference.

This application is also related to:
(I) U.S. Provisional Patent Application No. 61/411,926, filed on Nov. 10, 2010, entitled "Systems and methods to provide digital amenities for local stores," which is hereby incorporated herein by reference; and
(II) U.S. Provisional Patent Application No. 61/420,885, filed on Dec. 8, 2010, entitled "Systems and methods to provide digital amenities for local stores," which is hereby incorporated herein by reference.

BACKGROUND OF THE INVENTION

Field of the Invention

The present invention relates generally to providing digital information, and more particularly to providing digital information for local access.

Description of the Related Art

Mobile devices have been spreading like wild fire. Even very young children are using them extensively. For years, the main application of mobile devices has been making phone calls. But with the proliferation of smart phones and other types of high-performance mobile devices, people have been using these devices for numerous other applications, such as playing games and watching videos. Another major development is the significant increase in the popularity of cloud computing, where the applications are stored in large data farms. Remotely accessing large bandwidth applications quickly has become a major burden to the networks.

Imagine you are at an Internet café trying to watch a movie from a video site via a cellular network. It is on a Sunday and a major game, such as the Super Bowl, is played. Assume a number of customers are using the network with their mobile devices to watch the game. At the same time, other customers are using the network to access and play high-speed video games that need a lot of bandwidth. Very likely, watching your movie would not be a satisfying experience because the amount of time to download your movie is too long. With limited bandwidth and reduced speed, other customers probably would not be in much better shape than you. Such annoyance will lead to customer dissatisfaction of the Internet café, adversely affecting their business.

It should be apparent from the foregoing that there is still a need for better information access via wireless devices.

SUMMARY OF THE INVENTION

Many stores would like to provide different types of digital amenities to their customers. The amenities could be electronic newspapers and magazines, e-books, music, video, electronic games and advertisements. In one embodiment, the present invention provides a network box at a store for allowing digital amenities to be accessed at the store. The network box includes a network interface to couple to mobile devices at the store. The network interface could also be coupled to a computing device outside the store. This computing device can belong to the store or to a parent company of the store. In another example, this computing device can belong to an independent entity. The network box also includes a storage device and a computing device. The storage device can be used to keep the digital amenities. In one embodiment, in addition to providing services through the digital amenities, the network box also operates as a wireless network access point for mobile devices at the store.

Assume a user walks into the store with a mobile device. In one example, a piece of software related to the store, such as a store app, was previously downloaded into the device. The network interface could automatically recognize the device in view of the piece of software in the device, and allows the user to use the device to access digital amenities in the storage device. There could be different digital amenities, and the user accesses a first digital amenity. In view of the access, the network box could access a second digital amenity from the computing device, and pre-load it in the storage device.

As an example, the user accesses today's NY Times to read. Then the computing device analyzes such access and determines to access tomorrow's NY Times when it becomes available. For example, next day at 4 am in the morning, the network box could access that day's NY Times and keeps in the box to anticipate the NY Times to be accessed at the store. If the user goes to the store again the next day, the access time to get the NY Times from the network box should be significantly reduced.

To continue on with the example, for the next two weeks, the network box always pre-loads that day's NY Times in early hours. Assume that for the entire next two weeks, no one accesses NY Times from the network box again. In view of the lack of interest, the computing device could then delete all the NY Times from its storage and stop pre-loading NY Times.

Different digital amenities could be kept at the storage device. In one example, a number of digital amenities are tailored to the store. For example, if the store is a bicycle store, one type of digital amenity can be cycling electronic magazines.

The network box does not have to be limited to information access. In one embodiment, the computing device could allow a user to post a piece of information for other users to access. For example, after a user has finished reading an article on Steve Jobs at the store through her electronic reading device, the user writes a comment on the article, and sends it to the network box. And the network box could have the comment linked to the article. In the future, when other users access the article, the comment can be attached at the end of the article.

In one embodiment, the network box keeps track of at least some of the prior uses of users at the store. Based on such information, the network box could create user profiles. Then when such a user gets to the store, through information in her user profile, the network box could recommend the user to access a certain digital amenity. For example, the box could ask whether the user wants to access NY Times if the user has accessed it before at the store. In another example, the box would automatically download that day's NY Times to the user's mobile device when the user shows up at the store.

In one embodiment, the store has different sections catering to different types of customers. Depending on which section the user is at the store, different digital amenities could be recommended to the user.

In one embodiment, the network box is coupled to more than one computing device outside the store. The network interface could be configured to access different types of digital amenities from the different computing devices outside the store. For example, the network box could access digital amenities regarding its own products from one computing device, and NY Times from another computing device.

The network box could be of different dimensions. In one embodiment, the network box has the dimension of a USB thumb drive.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 8 shows a method performed by an ENAP according to an embodiment of the invention.

Same numerals in FIGS. 1-14 are assigned to similar elements in all the figures. Embodiments of the invention are discussed below with reference to FIGS. 1-13. However, those skilled in the art will readily appreciate that the detailed description given herein with respect to these figures is for explanatory purposes as the invention extends beyond these limited embodiments.

DETAILED DESCRIPTION OF THE INVENTION

One embodiment of the present invention is an Enhanced Network Access Point device (ENAP). The ENAP can be installed at a store. In one approach, the ENAP can be wirelessly connected to a back-end server via a network, such as the Internet. The back-end server can be the store's server, or can be a server managed by another entity. The back-end server can be a server farm with multiple servers. A user or a customer is at the store with a mobile device. With the ENAP, the mobile device can access at least some of the store's digital amenities, which can be at the store's server. In another approach, at least some of the store's digital amenities can be at the ENAP.

In one embodiment, the ENAP can be a software or software/hardware hybrid, and may be implemented on a programmable computing device that can be configured by software stored in memory. Examples of different operations that can be implemented in software for the ENAP include a web server, a web site, and an application server. The ENAP can be at least partially implemented on a card, such as an interface card for a network device or a computing device.

Figure 1:
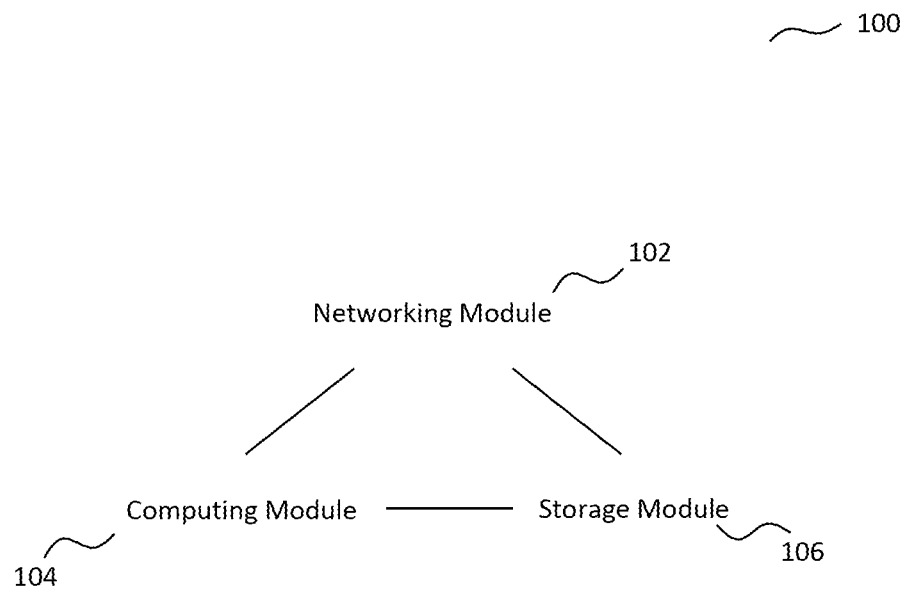
FIG. 1 shows an embodiment of an Enhanced Network Access Point device (ENAP) according to one embodiment of the invention.

FIG. 1 shows one embodiment of an ENAP 100, a network device, that includes a networking module 102, a computing module 104, and a storage module 106.

Figure 2A:
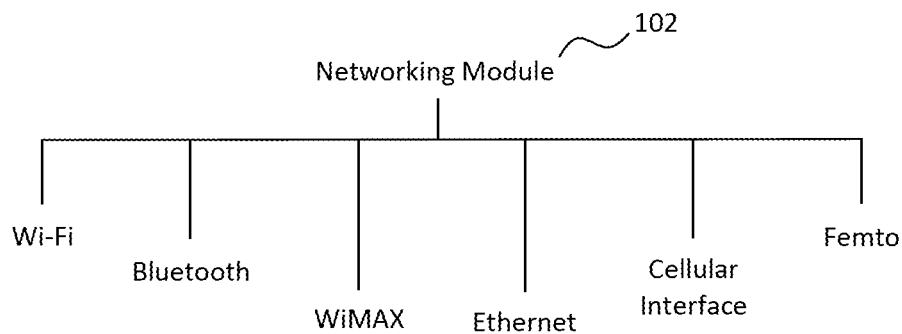
FIGS. 2A-B show different attributes of a networking module in an ENAP according to different embodiments of the invention.
Figure 2B:
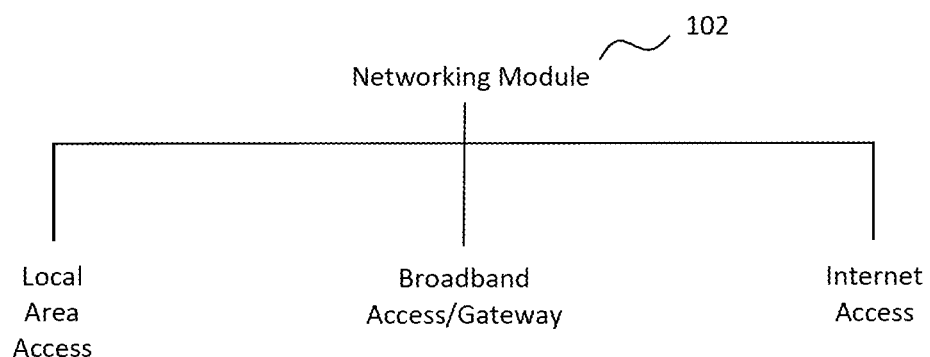

FIGS. 2A-B show different attributes of a networking module 102 in the ENAP 100 according to different embodiments. The networking module 102 can include one or more network interfaces, such as WiFi, Bluetooth, WiMAX, Ethernet, or cellular interface, for, such as, local area access, broadband access and/or general Internet access. The network module 102 can be connected to the mobile device using one of the wireless network interfaces, such as WiFi, Bluetooth, Ethernet and WiMAX. And the ENAP can be connected to the network outside of the store to a computing device, using one of the wireless network interfaces, such as WiMAX, Ethernet and cellular. In one embodiment, the computing device can be outside the store and not under the control of the store. In one example, the networking module 102 offers mobile to broadband access, such as Femto.

With the users being in close proximity to the ENAP, bandwidth and latency constraints to access at least the digital amenities in the ENAP can be significantly reduced. Regarding bandwidth issues, currently Verizon's broadband bandwidth is less than 100 Megabits per second, and the cellular bandwidths from AT&T or Verizon's 3G or 4G network typically are much less. A typical 3D TV streaming video requires about 20 Megabits per second and 1080p HD TV streaming video requires more than 4 Megabits per second. If a store has 30 customers watching videos via Verizon from their mobile devices, the viewing enjoyment would be significantly impaired. However, it is not difficult for a local network access point to provide 150 Megabits per second of bandwidth per access point. And if the typical usage of the estimated number of customers/users in a store exceeds 150 Megabits per second, a store can provide multiple ENAPs to satisfy their bandwidth request.

Regarding latency issues, the typical delay of a data packet travelling from coast to coast in the United States can be 100 milliseconds (ms) or higher. Often in a wide area network, a data packet may have to travel through a path much longer than the physical distance between the corresponding mobile device and application server. Also, in a cellular network, instead of directly travelling from the mobile device to the application server, a data packet typically needs to travel to the mobile service provider's core data network before going to the Internet. Therefore it can be difficult to determine the path of a data packet in a wide area network and to estimate the network latency of the data packet. Such typically unpredictable and long delays can significantly hamper the satisfaction of using certain applications, such as certain popular fast action games. For example, a car racing game or a shooting game can require a user's response time in the order of 20 ms. However, the typical delay of a local area network is less than 1 ms. With ENAP working in stores based on local area networks, signal delay issues are significantly reduced.

Another issue can be signal strength of an ENAP. In one example, wife signal strength is typically limited to 100 meters. It is not very challenging for an ENAP to have similar signal strengths. If longer distances are needed within a store, one again can provide additional ENAPs to the store at different locations.

Figure 3:
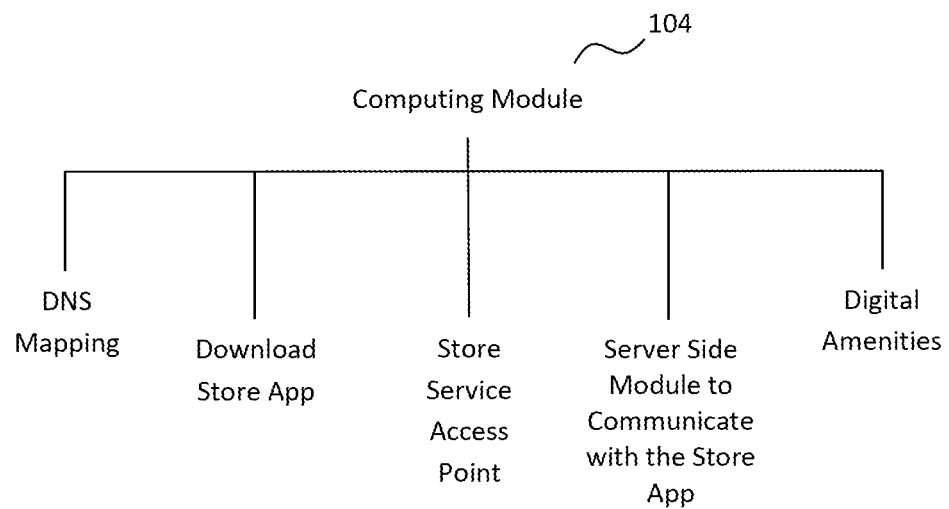
FIG. 3 shows different attributes of a computing module in an ENAP according to different embodiments of the invention.

FIG. 3 shows different attributes of a computing module 104 in the ENAP 100 according to different embodiments. The computing module 104 enhances network access to the mobile device. The computing module can include the software/firmware to perform, for example, one or more of the following and other operations, such as handling DNS mapping, downloading a store application, being the store's service access point, being the server side module to communicate with the store application, and serving digital amenities. Examples of the store application include an iPhone app or Blackberry app.

Figure 4:
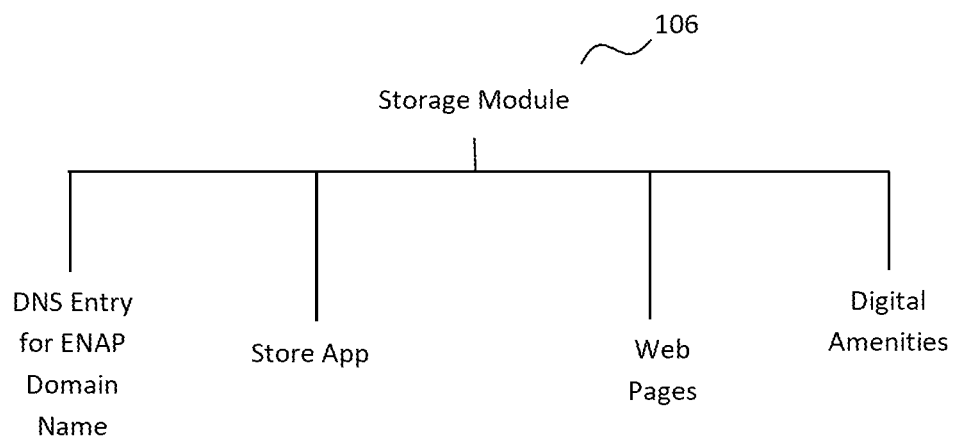
FIG. 4 shows different attributes of a storage module in an ENAP according to different embodiments of the invention.

FIG. 4 shows different attributes of a storage module 106 in the ENAP 100 according to different embodiments. The storage module 106 can store, for example, DNS entry for the ENAP domain name, store applications, one or more web pages, and one or more files for the store's digital amenities.

As an example, the ENAP 100 includes a broadband gateway, which can be a business/retailer broadband gateway, a residential broadband gateway or a corporate/office broadband gateway.

As another example, the ENAP includes a broadband gateway, an access point for the mobile device (such as a WiFi access point), and an Ethernet switch.

Regarding physical dimensions, as examples, the ENAP has a dimension similar to a WiFi access point, a broadband gateway, a cellular phone, a credit card, or a USB thumb drive. In one embodiment, an ENAP can be incorporated into a common object, such as a vase, a clock, a picture frame, a calendar, a trophy, a bookend, a flower pot, a candle stick holder, a desk lamp, a coaster, a dish, a tray, a mat, a pen holder, or other types of objects with ornamental design.

In one embodiment, the store can have more than one access points. For example, the store can have a private and a public access point. As the public access point, the ENAP in the store can be the connection point to customers' wireless devices. As the private access point of the store, the ENAP can be connected to the store's broadband gateway (which, in one implementation, is also included in the ENAP) to access to a back-end server. In another example, the ENAP can also operate as the back-end server, which can be in the store.

As another example of having more than one access point, the store can have more than one ENAP, with each covering an area of the store. For example, one ENAP can be used per room of the store, one ENAP per corner, one ENAP per 1000 square meters of the store, or even one ENAP per table in the store. In another example, more than one ENAP can be at one area of the store to provide higher bandwidth to that area of the store.

In one implementation, the ENAP can replace a network access point at the store. For example, the ENAP can replace the store's current network access point. In another example, the ENAP can replace the store's existing broadband gateway and/or access point to their customers' mobile devices, such as its WiFi access point. In yet another example, the ENAP can be installed as an additional access point to the store's existing network access point(s).

Figure 5:
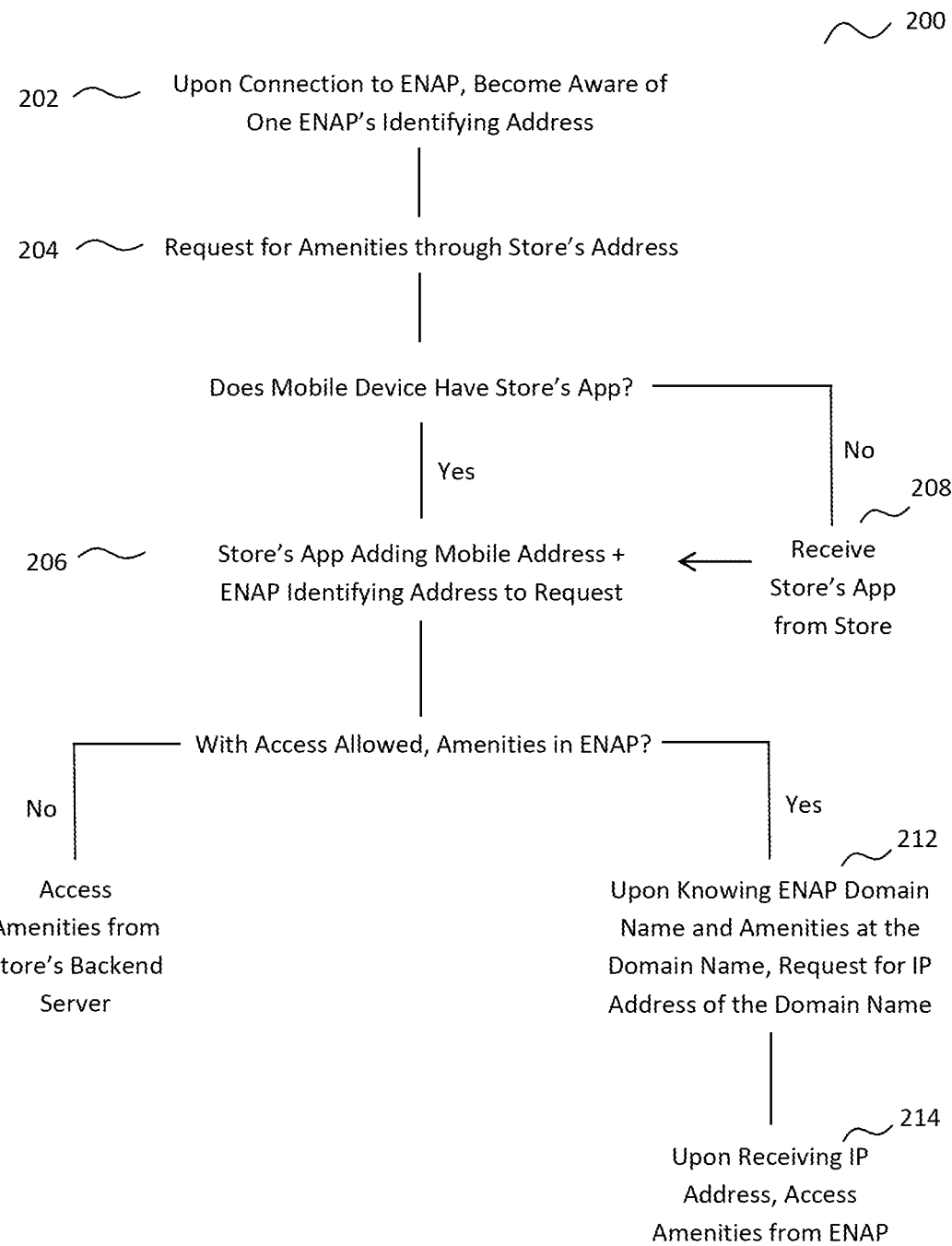
FIG. 5 shows a process of a mobile device requesting access to a store's amenities according to one embodiment of the invention.
Figure 6:
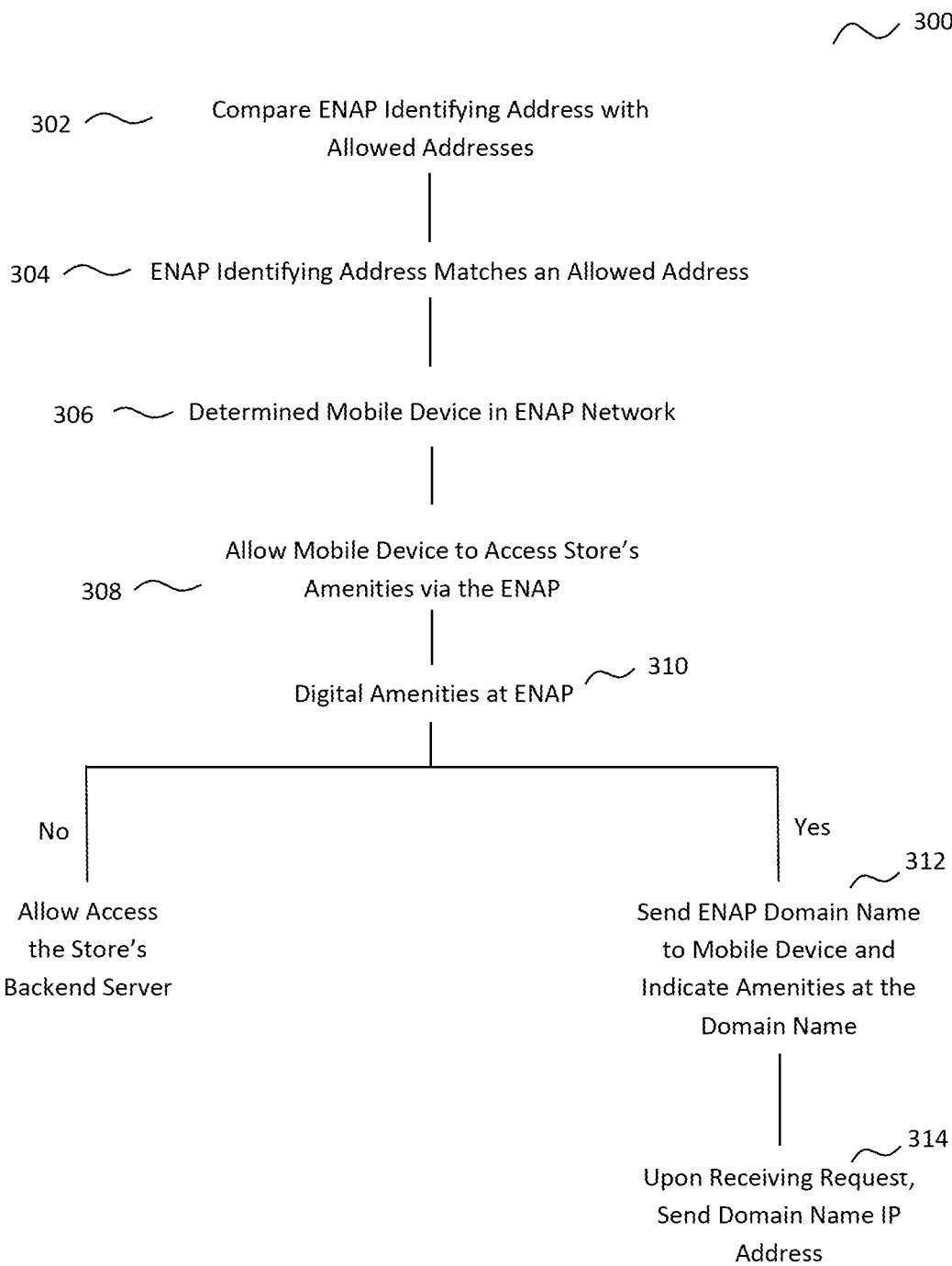
FIG. 6 shows a process of a store determining to allow a mobile device to access the store's digital amenities according to one embodiment of the invention.

FIG. 5 shows a process 200 of a mobile device requesting access to a store's amenities according to one embodiment, and FIG. 6 shows a process 300 of a store determining to allow a mobile device to access the store's digital amenities according to one embodiment. For example, the user connects its mobile device to the store's ENAP through the store's local area network, which can be a WiFi network. Through the connection, the mobile device becomes aware 202 of an identifying address of the ENAP, which can be designed to specifically or uniquely identify the ENAP. An example of such an address is the MAC address of the ENAP. Also, through the connection, the ENAP can become aware of the mobile device's address. After the connection, the user enters the store's address (e.g. www.store.com) into the mobile device to request 204 for amenities. Through the local area network, the ENAP directs the request to its back-end server.

In one embodiment, the mobile device includes the store application previously downloaded into the device. The store application can add 204 the mobile device's address and the ENAP identifying address in the request to the back-end server. The back-end server includes a NAP database, which keeps one or more ENAP identifying addresses, and compares 302 the received ENAP identifying address with the one or more ENAP identifying addresses in its NAP database. If there is a match 304, and if it is determined 306 that the mobile device is in the ENAP network, the server responds to the mobile device through the ENAP, allowing 308 the mobile device to access and enjoy the store's amenities via the ENAP.

In another embodiment, the mobile device does not have the store application. Again, the mobile device sends the request to the back-end server. In this case, the request may be sent by a browser and may not include the ENAP identifying address. Then the mobile device receives 208 the store application. Based on the store application, a subsequent request is sent to the back-end server. This request includes the ENAP identifying address, and as explained above, the mobile device can then be allowed to access the store's amenities.

In one approach, the ENAP serves as both the store's network access point and service access point for at least some of the services offered by the store. The store's digital amenities, or at least some of them, can be in the ENAP. One way to establish the ENAP to be the service access point is to 312 include in the response from the back-end server to the request for connection from the mobile device the ENAP domain name (e.g. local.store.com); and instruct the mobile device that digital amenities are at the location of the domain name. When the mobile device gets the response, the mobile device sends 212 another request to the ENAP for the IP address of the ENAP domain name. The ENAP has DNS entries to map or resolve the ENAP domain name to the IP address of the ENAP. Upon getting the request, the ENAP can send 314 the IP address corresponding to its domain name to the mobile device. After getting the IP address, the mobile device can access 214 amenities from the ENAP. The ENAP is then served as the service access point of the mobile device, or as the server of the ENAP domain name. Subsequently, the ENAP can download the store's amenities, which can be store applications to the mobile device. In this situation, the store's digital amenities or at least some of them are at the ENAP, and the mobile device can access them from the ENAP. The data access time and interaction time for amenities in this approach is typically shorter than the corresponding time required if the amenities are in the back-end server. One type of amenities can be games and other interactive media, where access time and/or interaction time can be important for user satisfaction.

With the ENAP also serving as the service access point, the ENAP typically needs more storage capacity. In one approach, the ENAP can have a storage capacity of 100 gigabytes or more, such as 1 terabytes.

In another embodiment, when the user enters the store and connects the mobile device to the ENAP, the ENAP also has accessed the mobile device's location, such as its GPS location. Subsequently the ENAP sends the location information to the back-end server. In addition to the ENAP address, the server also can check the location of the mobile device to see if the mobile device is located at the store or in close proximity to the store. If verified, the server allows the mobile device to access the store's digital amenities. This approach allows multiple stores, such as a chain store, to share the same ENAP domain name.

In one embodiment, the back-end server can periodically download or access information from the ENAPs of a number of stores. This allows the server to perform statistical analysis based on the information from the multiple ENAPs.

Figure 7A:
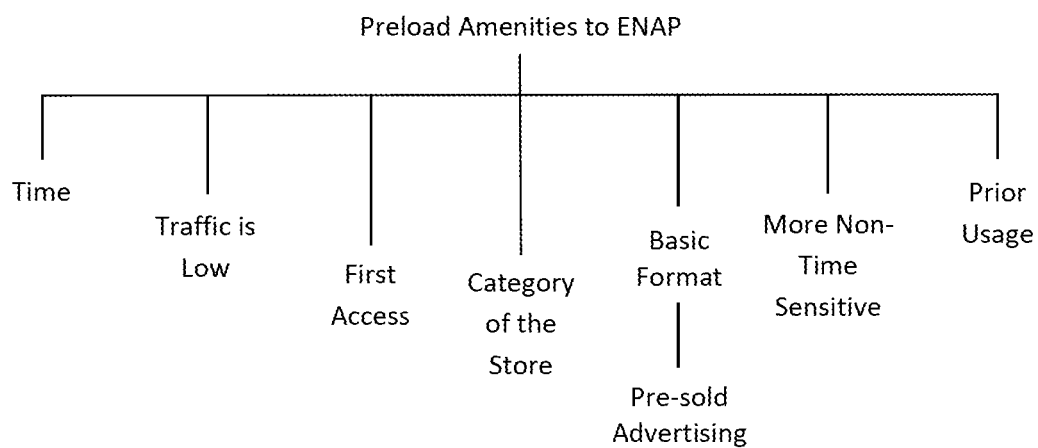
FIGS. 7A-B show different attributes regarding pre-loading amenities to and removing amenities from an ENAP according to different embodiments of the invention.

There are different ways/criteria to pre-load the store's digital amenities in the ENAP. FIG. 7A shows different attributes regarding pre-loading amenities to the ENAP according to different embodiments. For example, digital amenities can be downloaded to the ENAP and cached in early morning (based on time) or when the traffic at the store is low. In another approach, when the first person accesses a digital amenity such as an e-newspaper on a specific day, the first person gets the amenity from the back-end server. After this first download, the newspaper can be cached and stored in the ENAP. The next person would be accessing the newspaper from the ENAP.

In one embodiment, a store typically belongs to a certain category or type. Customers or users of different type or category of stores typically have certain common preferences regarding digital amenities. Based on the type(s) of the store, certain digital amenities are downloaded ahead of time. For example, local newspapers are downloaded to a coffee shop ahead of time.

In yet another approach, basic formats of a digital amenity, such as a publication like a magazine, are downloaded ahead of time and stored or cached in the ENAP. One example of a basic format is the table of content, such as for a newspaper. Subsequently, new contents are transmitted to be incorporated into the pre-downloaded format. In one embodiment, basic formats are areas that are more constant. For example, a newspaper has its standard layouts, such as the title of the newspaper, and certain sections with pre-sold advertising. These contents are pre-downloaded. The contents regarding the news of the day, more current or more time-sensitive contents are downloaded, such as in early morning, or as they become available.

In another approach, based on prior usage, the ENAP can proactively download certain digital information ahead of time to be subsequently accessed. This proactive download can be based on a prediction software or statistical analysis. For example, statistically, many of the store's customers typically like to access Wall Street Journal when they are at the store. Then the ENAP can proactively download the Journal each day before the store opens.

Figure 7B:
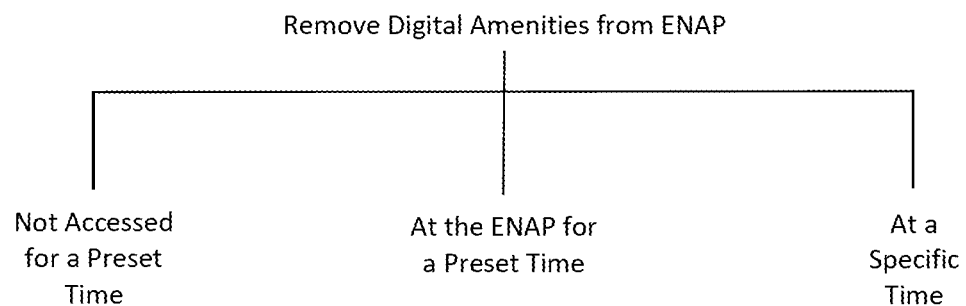

FIG. 7B shows different attributes regarding removing amenities from the ENAP according to different embodiments. For example, an amenity is removed from the ENAP if the amenity has not been accessed for a predetermined duration of time. In another example, an amenity is removed from the ENAP after it has been at the ENAP for a predetermined duration of time. In yet another example, an amenity is removed at a specific time, such as an expiration date. For example, daily newspapers can be removed at the end of each day, weekly magazines can be removed at the end of each week. These rules can be combined. For example, an amenity will be removed at a specific time unless the amenity has been accessed more than a preset number of times within a preset amount of time immediately before the specific time.

FIG. 8 shows an embodiment of a method 400 performed by an ENAP or a network apparatus. The embodiment summarizes a number of processes described above. The method helps a mobile device of a user access digital amenities via the network apparatus at a store, with the network apparatus having different digital amenities. The method 400 includes recognizing 402 the mobile device at the store at least in view of a piece of software related to the store in the mobile device; allowing 404 the mobile device to access a first digital amenity from the network apparatus at least in view of the piece of software in the mobile device; determining 406 if the mobile device has accessed the first digital amenity from the network apparatus; accessing 408 a second digital amenity from a computing device outside the store to be kept at the network apparatus, in view of the determining that the first digital amenity has been accessed; and storing 410 the second digital amenity in the network apparatus. The second digital amenity in the network apparatus enhances transmitting the second digital amenity from the network apparatus to the mobile device if the mobile device is at the store.

Figure 9A:
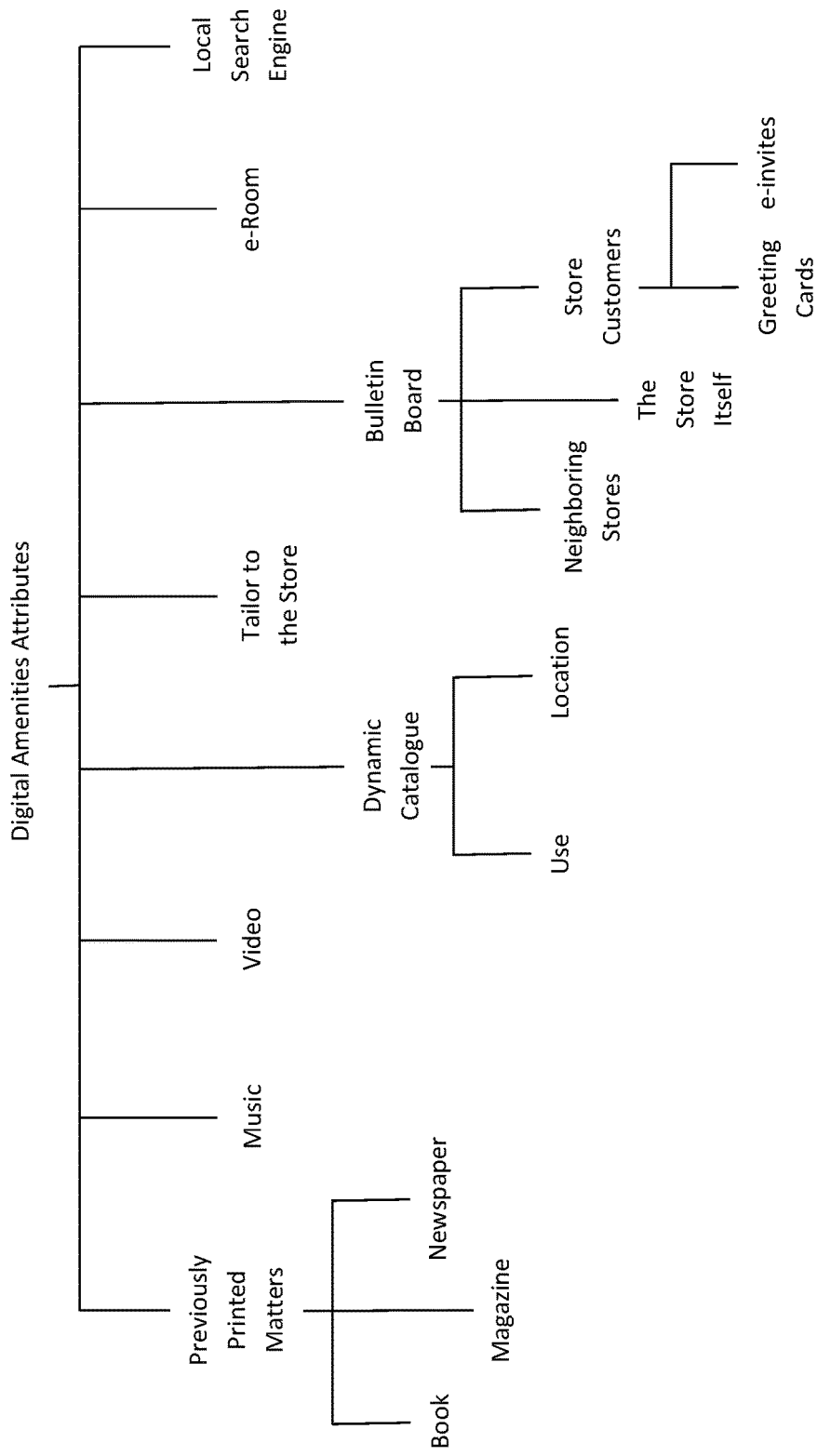
FIGS. 9A-B show examples or attributes of digital amenities according to different embodiments of the invention.
Figure 9B:
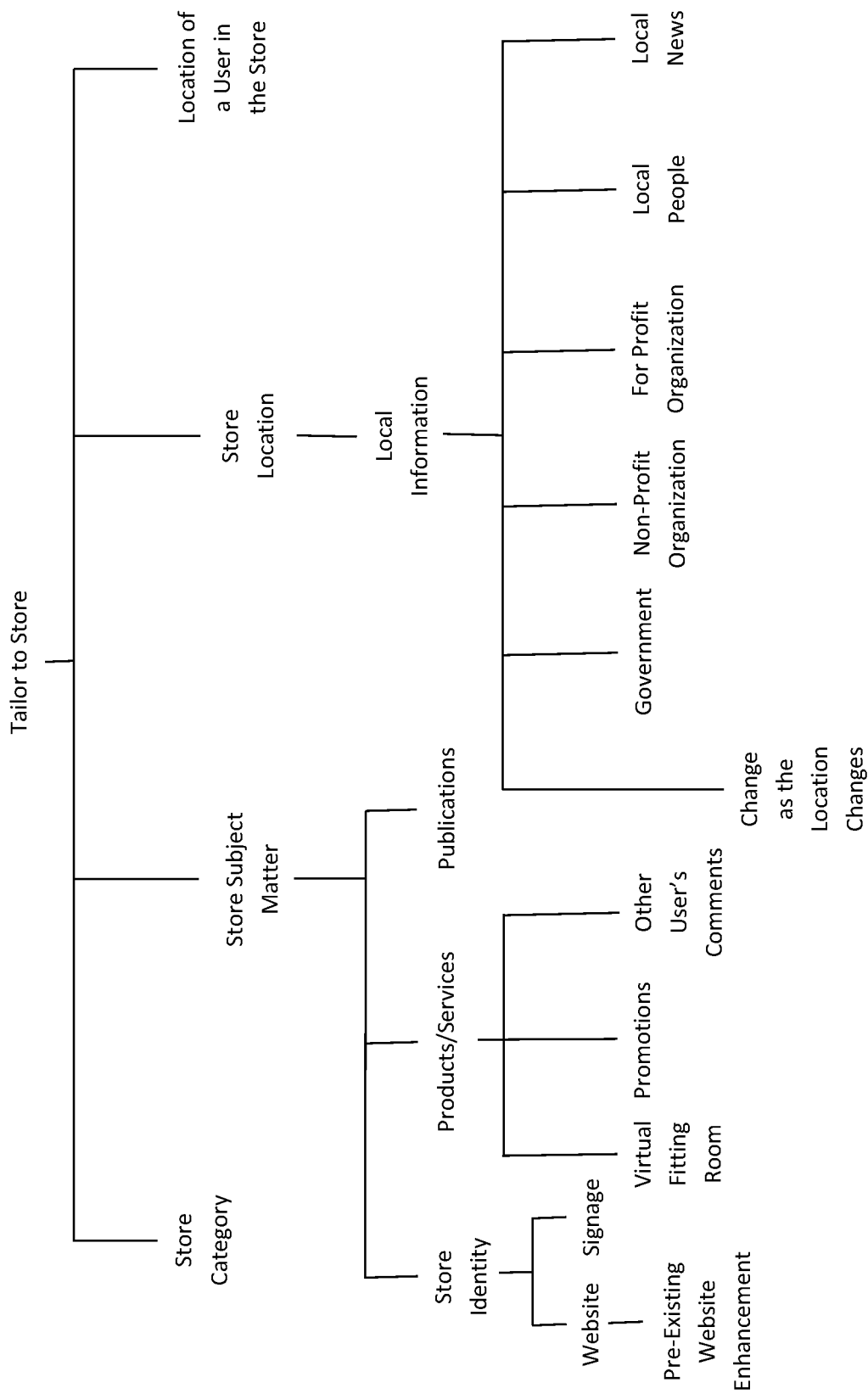

FIGS. 9A-B show examples or attributes of digital amenities according to different embodiments. In one example, a store's web page can provide a catalogue of digital amenities, which can include, for example, previously printed matters, such as e-newspaper, e-magazines, maps (which can be maps of local areas), and e-books; music; video; and advertisements. And the user can select to consume the desired amenity from the catalogue. In one embodiment, the user accesses the store's digital amenities through a store application.

In one embodiment, a catalogue of digital amenities can depend on usage. For example, the catalogue is dynamic and it changes depending on use. To illustrate, a user tries to access a magazine. Before the access, the catalogue does not have the magazine. After the request by the user, the magazine is downloaded into the ENAP of the store, and the catalogue is updated to include the magazine. In another example, a catalogue is dynamic and it changes based on the store's location. To illustrate, the catalogue of a book store in Silicon Valley has more technology-related business information, while a book store in Hollywood has more movie-related information.

In another embodiment, the store's amenities can be tailored to the store, with examples shown in FIG. 9B according to different embodiments.

In one example, stores can be categorized under different categories. The categories can be by industries, such as banks, law firms, and restaurants. The categories can follow the categorizations in yellow pages. There can be a hierarchy of categories. For example, within a category, there can be sub-categories. For example, within a category on eating, there can be bakeries, bar & grills, Chinese restaurants, Mexican restaurants, and family-style restaurants. The categories can be city specific. The store can belong to at least one category. In one embodiment, at least some of the amenities are tailored to the at least one category.

The tailoring can be related to subject matter within the store or of the store, such as about the store's products; or related to the location of the store, such as local information.

There are different types of information related to subject matter within the store or of the store. One example is related to the store's identity, such as a digital signage of the store; or the store's web page, which can be the store's Facebook page, or a social connection site of the store.

In one embodiment, the store has a pre-existing website or Facebook page. The digital amenity regarding the store's website can be enhancements to the store's pre-existing website. In this example, the digital identity of the store is maintained, or substantially maintained.

Another example of subject matter related to the store is the store's products/services. If the store is a restaurant, the web page of the store can include a menu. The web page can also include promotions related to the services/products, such as coupons, specials, and/or recommendations to potential customers. The user can download the store's coupon or specials, and order products and/or services using the coupons. The ordering can be done wirelessly from the user's mobile device. Such ordering using the mobile device allows the store to keep track of the order being from the user. In another example, recommendations from the store can be based on other users' comments or suggestions.

In one example, the store is a clothing store and one digital amenity is a virtual fitting room. Beautiful clothing can require a fair amount of bandwidth. With the ENAP in the store, bandwidth constraint for downloading different clothing to the user's wireless device is significantly reduced. In one embodiment, the store is not a clothing store and the virtual fitting room can be an application for customers, such as girls, to try out different clothing virtually just for fun. In another example, different publications, such as e-newspapers, e-magazines and e-books, provided in the store's amenities, can be tailored to the store. They can be related to what the store offers.

In one approach, digital amenities tailored to the store depend on the location of the store, such as information about local people, community, organizations, areas and/or merchants. Typically, these are local information.

The local information can be related to local non-profit entities, local government-related entities, local people or local demographics. For example, the amenities can be local community information (such as local community events); information of the city where the store is located; local government information; announcements related to local areas; local news and/or local directories. Other local information provided to the user as a form of amenities can be from local for-profit entities, including real estate listings and rentals.

In one embodiment, the location of the store can change from time to time. For example, the store is a moving object, such as a ship. As the ship moves from port to port, the catalogue of digital amenities changes. To illustrate, as the ship moves from France to Italy, the language of the catalogue changes from French to Italian. For another example, as a mass transit, such as a train, goes from one stop to the next, at least some of the digital amenities provided by an ENAP in the train change.

In one embodiment, the local information includes advertisement of products/services from local or neighboring shops. They can be shops typically complementary to the store, or they do not compete with the store.

In another embodiment, the store provides a digital bulletin board as an amenity in a store application. The board can be used by neighboring shops. For example, a neighboring bookstore can post a sale to the digital bulletin board of the store (e.g. a coffee shop); a neighboring bakery shop posts its menu onto the digital bulletin board of the store (e.g. a bookstore); nearby laundries post onto the store's bulletin board their services and pricing information; and a sandwich deli posts its specials of the day onto the bulletin board of the store (e.g. a clinic) an hour before lunch hour.

In one embodiment, the store's digital bulletin board can allow the store to post store pictures, videos, and other special announcements regarding the store (such as holiday specials, Monday Night Football specials and upcoming sales in a week).

In one embodiment, the store application allows the user to post a piece of information on the bulletin board. The store may require the user to obtain a key in order to post the piece of information. In one example, the user will be given a key if the user orders a product/service from the store. The piece of information posted by the user can be, for example, an announcement by the user, a greeting card from the user, an e-invite by the user, and a comment by the user. The piece of information can be in text, images, audio and/or video. The piece of information can be from the user's mobile device.

In one example, the piece of information from the user is an announcement by the user. The announcement can be related to looking for a person, such as looking for a nanny, a math tutor, a roommate or a lost person; looking for a thing, such as an apartment or a missing dog; or a personal announcement, such as a garage sale or just got married.

In another example, the piece of information from the user is a greeting card and/or an e-invite from the user. In one embodiment, the store provides a gallery of digital media, such as from the ENAP. The user can select from the digital media and then subsequently add additional information to the selection. For example, the user can select from a gallery of e-card templates offered by the ENAP, and subsequently personalize the selected e-card by adding a note to it or signing it. In one example, the user can post an e-card to friends through, for example, social network sites, email or instant messaging.

In one approach, the store application can add the store signature to the piece of information posted by the user, indicating the piece of information being generated at the store. The signature can be one or more of the following: the store's name, logo, identity, and picture. The signature can also include the store's location. An example of a signature is 'a customer of Starbucks at the corner of Mary & Sunnyvale Ave.' Such signature can help promote the store.

In yet another example, the piece of information from the user is a comment from the user. The comments can be related to the digital amenities consumed by or provided to the user. For example, the store application includes an e-reader component allowing the user to read e-newspaper or e-magazine. The e-newspaper can prompt the user to share an opinion, such as via a poll. The e-reader invokes the store application to create a box, such as a dialog box, for the user to provide a comment. After the user enters the comment into the box, the store application can insert a store signature to the comment and submits them to the e-reader. Then the e-reader posts the comment to the corresponding materials, such as the e-newspaper or e-magazine. In addition, the store application can post the comment and a reference to the materials being commented onto the digital bulletin board.

Figure 10:
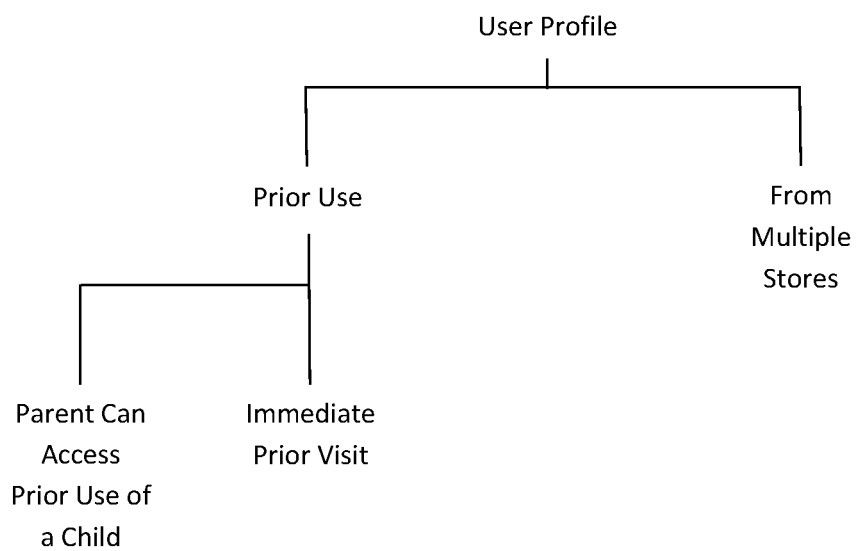
FIG. 10 shows a number of attributes regarding a user profile according to different embodiments of the invention.

In one embodiment, the ENAP and/or its back-end server keeps track of prior use of or prior interactions with the mobile device of the user in the store. Based on such tracked information, a user profile regarding the user can be built. FIG. 10 shows a number of attributes of a user profile according to different embodiments.

In one embodiment, the user being tracked is a child. The child's guardian, such as the child's parents, can access the child's use. For example, the name of the game the child has been playing and the duration the child has been playing are kept tracked of. The parents can be given authorization to access such usage by the child. The access can be via the web.

In another embodiment, the store's server can generate the user's profile. In one approach, the store is related to a number of stores, such as a chain of stores. The store's server can access users' information from the number of stores. If the user's prior interactions with one or more of these stores are tracked, the server can aggregate the user's information from the multiple stores to generate the user profile. Recommendations to the user or to other users can be provided to the user based on such information. As another example, the ENAP keeps track of the user's immediate prior usage during a prior visit and suggests the user to continue where she left off from her prior visit. To illustrate, the user was at a certain page of an e-book and is informed of that page during the next visit. Or updates regarding what the user is interested in can be sent to the user. For example, the user has spent a lot of time on a book regarding Lego Star Wars in a prior visit. When a new edition of Lego magazine is available, the store application would automatically ask the user if the user wants to read it when the user is at the store again. As another illustration, the ENAP keeps track of at least some of the user's interactions in playing a game. When the user returns, the ENAP can ask whether the user would like to resume playing the game.

In one example, tailoring can be to both the store and to the user. For example, an ENAP can be configured to keep track of a prior use of a first digital amenity by a user at a store via the wireless device at the store. The prior use is subsequently analyzed and based on the analysis, a second digital amenity from a computing device outside the store is stored at the ENAP. In one embodiment, the analysis can be done at the ENAP. In another embodiment, the analysis can be performed at the computing device. The second digital amenity at the storage module enhances accessing the second digital amenity from the ENAP by the mobile device at the store upon the user's subsequent arrival at the store. Both the first and the second digital amenities can be tailored to the store.

Different examples of tailored information or digital amenities can be proactively downloaded to the user's mobile device. This can be done such as by prediction software.

Figure 11:
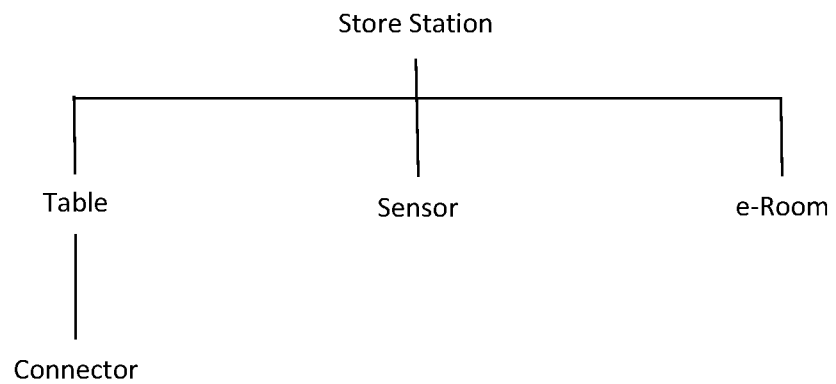
FIG. 11 shows a number of attributes regarding a store station according to different embodiments of the invention.

In one embodiment, the store has different stations, such as different tables or rooms. FIG. 11 shows a number of attributes regarding a store station according to different embodiments. For example, the store is a restaurant and each station can be a table with a table number. The user can order food from the store's website and enter the table number. Then someone from the store can deliver the food ordered to the table. In one embodiment, to ensure that the user has entered the right table number, the store application would ask the user to enter the table number more than once, such as once before selecting the items and a second time after selecting the items.

In one approach, there are additional sensor(s) in the store to help identify the location of the user or the user's mobile device in the store. For example, there can be a physical connector, such as a USB connector, at the table of the user. If the user connects her mobile device to the connector, the location of the device within the store would be more accurately identified. Another approach can be based on having at least three network access points in the store to identify the location of the user via triangulation techniques, which should be known to those skilled in the art. Yet another approach is to give a store device to the user when she enters the store. There can be multiple sensors in the store to sense the location of the store device. An example of such a store device is a RFID tag. By knowing the location of the user in the store, the store can tailor amenities in view of such location to the user. For example, if the user is sitting at the bar area of the store, liquor advertisements can be provided to the user's mobile device.

Figure 12:
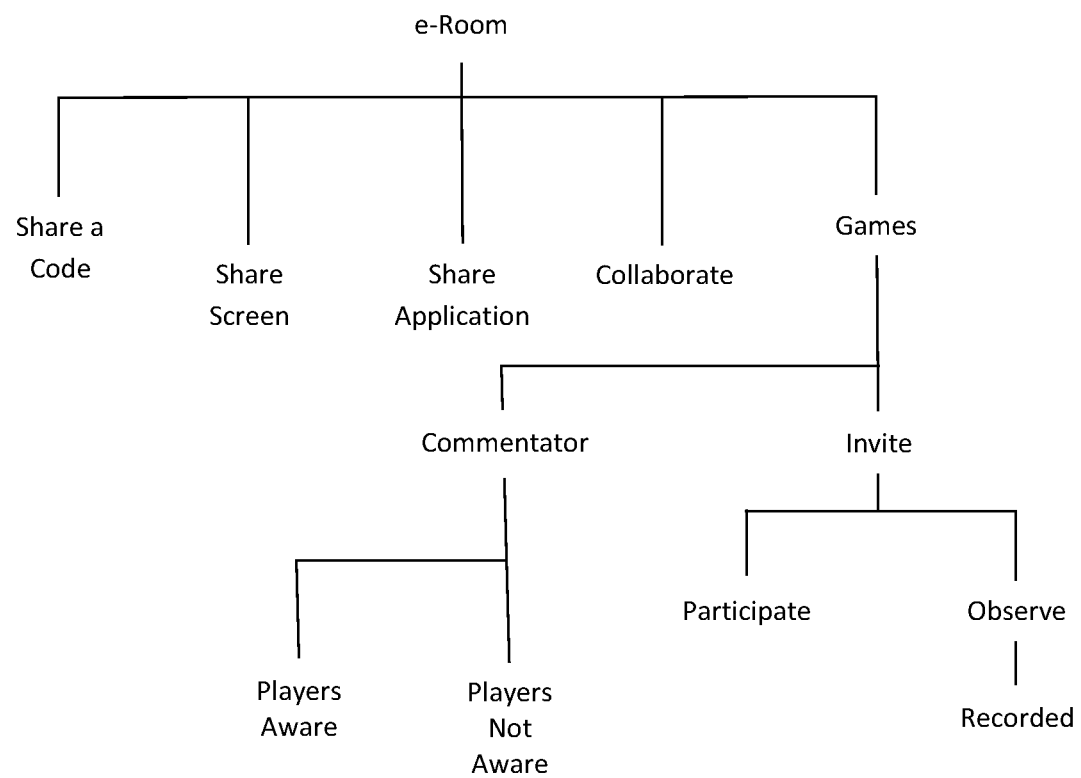
FIG. 12 shows a number of attributes of an e-room according to different embodiments of the invention.

In one embodiment, a station in the store can serve as an e-room. For example, the store application includes an e-room module. FIG. 12 shows a number of attributes of an e-room according to different embodiments. The ENAP in the store can host multiple e-rooms. With the ENAP hosting e-rooms in the store, again bandwidth and/or latency limitation in accessing information by users in the e-rooms can be significantly reduced. However, due to computational capacity and/or storage capacity limitation, the number of e-rooms the ENAP can host can be limited. If such constraint does occur and if the store wants more e-rooms, the store can install additional ENAPs.

A group of users, each with a mobile device, can use an e-room in the store. In one approach, they can choose the e-room digital amenities by selecting an unoccupied e-room, or opening an e-room. Each of them can get a code from the store, such as from a store application. The code from the store can be provided by the store e-room module in the store application. All the users in the room can use the same code. Based on the code, the devices of the users can be networked together. In another approach, one of the users can serve as the host. That user can obtain a code or a key from the store to open or to use an unoccupied e-room. If the store is a restaurant, the user can be given a key by ordering food.

Depending on the embodiments, the users in an e-room can share screens and/or share applications. In one approach, each station can have one or more monitors or TVs, such as HDTV or IPTV. There can be a TV set on the table of the user for personalized IPTV. For example, the ENAP can connect the devices of the users in the group to a TV. The users can share their materials on and interact through the TV.

An e-room in the store can be for different applications, such as for sharing what they are working on or playing with, chatting, sharing notes, and/or collaborating together. In one embodiment, the user is using an e-room to play games, such as a video game or a Wii game. The user can serve as the host user and start a game in the e-room. The game can be a chess game, mahjong, bridge, a multi-person shooting game (e.g. Halo Reach), and a single-person social game (e.g. Farmville). The user can invite other users to join by posting an invitation on the e-room. The invitation can include a picture of the user. In one embodiment, the invitation is to other(s), asking if they would join the user to play the game. In another embodiment, the invitation is to other(s), asking if they would like to watch or observe the playing of the game.

In one approach, another user using e-room digital amenities sees the game room invitation. There can be different types of invitation and/or request. For example, one invitation can be for participating, the other observation. The another user asks to enter the game room to play. If the host user accepts the request, the another user can join the host user. They can start playing chess, for example. A third user using e-room digital amenities can ask to enter the e-room to observe. In one approach, an observer is automatically accepted, without the host user's permission. Another approach needs the host user's permission before the third user can join. Upon joining, the third user can observe the game, or the game is presented to the third user. This observation function does not have to be simultaneous with the game being played. For example, if the game is a chess game, the store application can record the moves of both players and plays them back from the beginning to the third player.

In one embodiment, there can be at least one commentator for a game, such as a two player, turn-based game, such as chess. The commentator, being an observer, can comment on the game. In one approach, the players are aware of the comments made by the commentator and/or can see the commentator. In another embodiment, the players are not aware of the comments made by the commentator and/or cannot see the commentator.

As another example, users can be playing a shooting game. With the ENAP hosting the game, the users in the e-room are on the same local network. In this situation, the latency or network signal jitter caused by the local network is minimal, or is much less than using a wide area network. This translates to better response and playing experience.

In yet another example, the e-room can be used as a chat room. The user can select an unoccupied chat room and posts invitation inviting others to join. The invitation can be for a group of friends at the store. When they see the host user's invitation, they ask to join. The host user can accept their requests and subsequently close the chat room to other users, such as by removing the invitation. In this example, after the host user closes the room, the closed room can be marked as occupied, with no invitation. Other users would be restricted from joining. In another example, the group of friends can use the chat room for an activity such as watching a video, reading an e-book, and working on a subject matter. The subject matter can be a study group. As an illustration, the subject matter can be strategizing on an upcoming baseball game, and digital promotional materials regarding baseball can be sent to the group. In another illustration, the group can be reading an e-book or an article together; they can post and share comments with other users in the group.

In one embodiment, e-room(s) are for a restaurant. In this example, each e-room can include a side bar for ordering food, or the side bar can post a menu.

Figure 13:
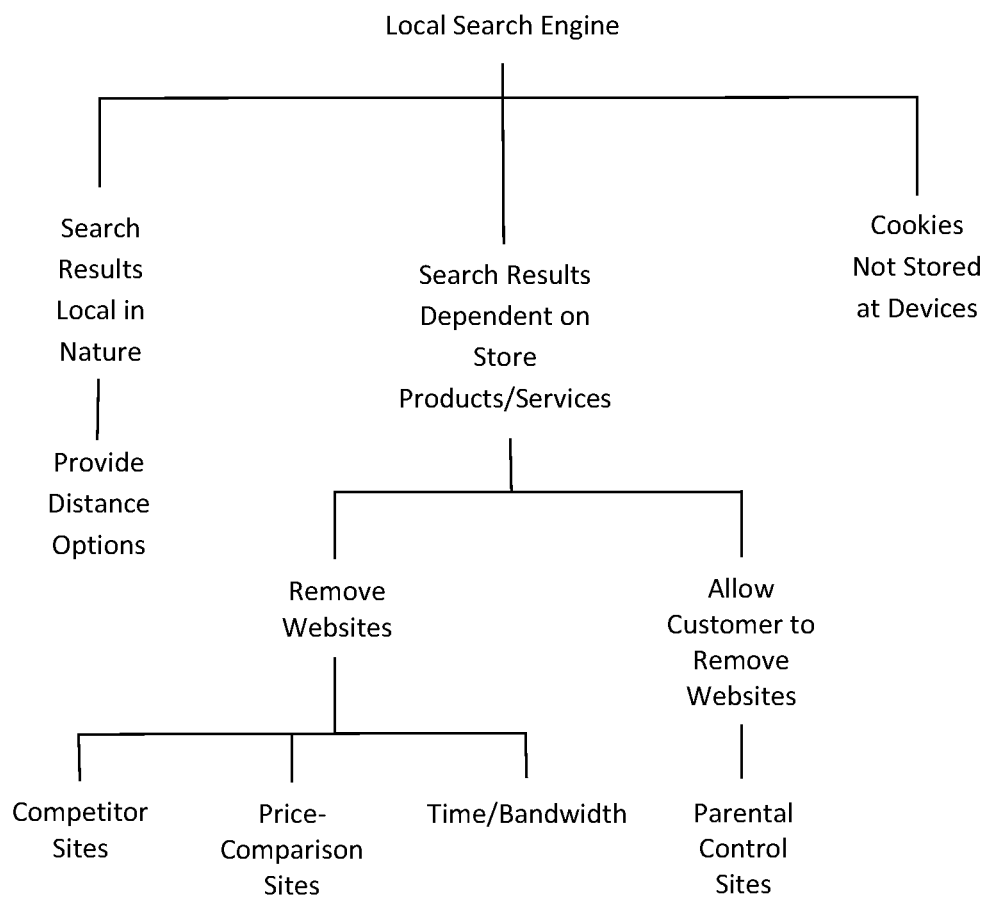
FIG. 13 shows a number of attributes of a local search engine according to different embodiments of the invention.

Another type of digital amenities is to provide a local search engine to the user. FIG. 13 shows a number of attributes of a local search engine according to different embodiments. A store application can provide a search engine that is aware of the location of the store, with the search results depending on the location. For example, the engine can provide search results that are local in nature, such as local directories, local phone book, local businesses, local news, local travel guide, local cuisine, local customs, local fashion, local style and/or local community information. The search can help determine where to grab a fast lunch close to the store, where to find the closest ATM, maids for hire, rooms for rent or houses in the neighborhood for sale. For example, the store application can provide a dialog box that allows the user to search. When the user enters her query, the store application can ask the user whether she wants the search results to be local in nature. If the answer is affirmative, in one approach, the store application could further provide a number of distance options for the user to select, such as within 5, 10 or 15 miles, or in the city or county of the store. The default can be 10 miles. Based on the user's response, the store application can automatically add additional terms in the query to limit the search results. For example, if the user just wants search results to be from the city of the store, before the query is submitted to a general search engine (such as from Google), the store application can add the city name into the query. In one example, the store application can add the store physical address (such as names of intersecting streets closest to the store) into the query. In another embodiment, without asking the user, the store application filters the search results such that the search results local to the store (such as within ten miles) are ranked higher or placed earlier than the results that are not local to the store.

In one embodiment, the search engine is also aware of the products and/or services provided by the store, with the search results depending on such. The engine can include a database of websites that are removed from the search results. For example, the store's competitors are removed from the search results. All price comparison websites can be removed from the search results, such as for a store that sells products. Whether a site is removed can depend on time and/or bandwidth requirements of the search results. For example, a fast food store may not want a customer to spend too much time at the store. Such a store can remove games that require more than a predetermined amount of time to finish. Or such a store can remove games that exceed a predetermined amount of bandwidth because such games may be more complex and require a long time to play. In another embodiment, the search engine can allow customers to remove certain websites from search results. For example, customers can activate parental control to remove sites that are age-inappropriate.

In one embodiment, store owners can get advertising income from their neighboring businesses by allowing those businesses to post information on the store's website, or to be higher up in the search results from the store's search engine.

In yet another embodiment, cookies from websites accessed by customers' devices are not stored at the devices. For example, websites see the store's ENAP accessing, but not the corresponding customers' devices. This can provide anonymous browsing, and can protect kids.

Figure 14A:
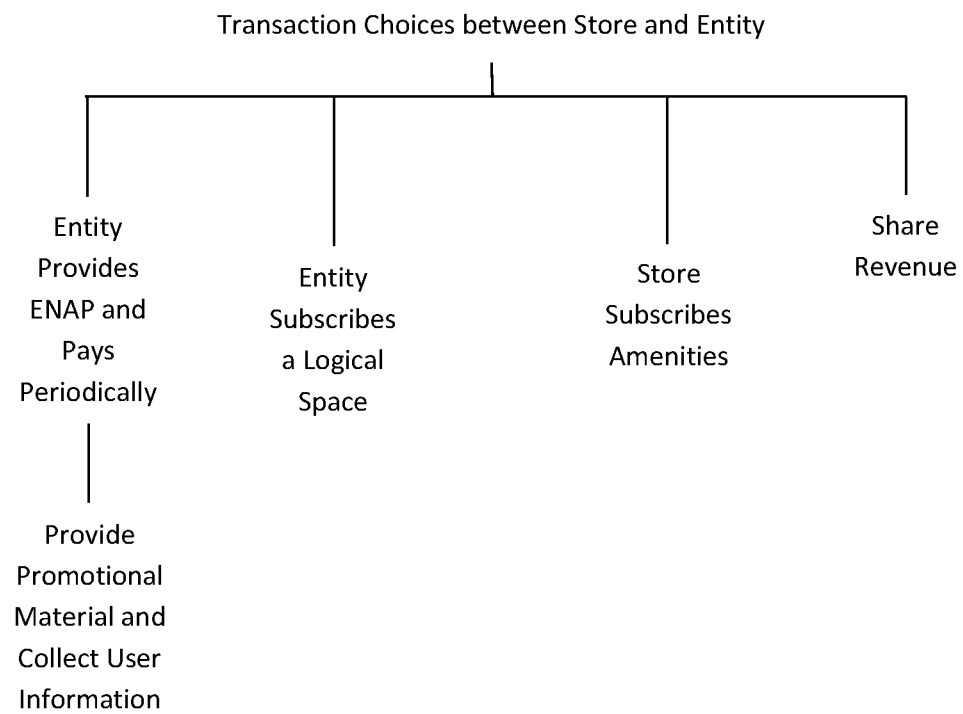
FIGS. 14A-B show examples of transaction choices regarding digital amenities of a store according to different embodiments of the invention.

There can be different types of transaction choices or business arrangements between the store and an entity that provides amenities. FIG. 14A shows examples of transaction choices between a store and the entity according to different embodiments. In one example, the entity provides the store's ENAP, and pays the store periodically (e.g. a monthly fee) to have the ENAP at the store. The entity can install the ENAP for the store. The entity can be allowed to provide promotional materials, and to collect user information. An entity can be a publisher of digital information, and can push different amenities, which can be tailored information, to the ENAP. Instead of providing the ENAP, in another example, the entity can subscribe to a logical space at the store's ENAP. To illustrate, Hearst, being the publisher of magazines (such as Esquire) and newspaper (such as SF Chronicles), can run a digital news stand at the ENAP by leasing digital space from the store's ENAP. The ENAP can be connected to the servers of multiple entities to get information or digital amenities from them. These multiple entities, each can lease digital spaces from the store. In another example, instead of an entity paying the store, the store can subscribe to ENAP services from the entity. In yet another example, the store can get a commission or share revenue with the entity providing the ENAP or digital amenities at the store's ENAP.

Figure 14B:
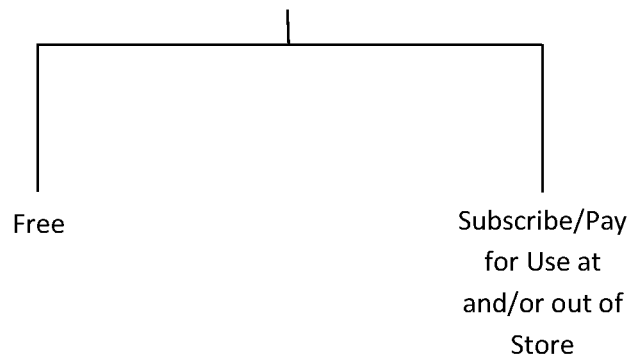

There can also be different transaction choices or business arrangements between the store and the user(s). FIG. 14B shows examples of transaction choices between a store and a user according to different embodiments. For example, the user can access digital amenities at the store free of charge; and/or purchase/subscribe with or without a discount for consumption of digital amenities at the store only, and/or out of the store also. In different embodiments, the store can keep track of the user's interactions or usage regarding the different amenities. Depending on the arrangement, an entity providing digital amenities to the store can also keep track of and use such user information to the entity's advantage.

Different types of digital amenities/information have been described in different embodiments. For example, digital amenities applicable to different types of stores can include digital version of flyers, postcards, e-invites, posters, community newsletters, community announcements, user postings (e.g., apartment rental, job posting, employee seeking, house maid seeking, and lost & found), comic strips, event announcements, podcasts, games, coloring books/drawings for kids, blank papers for posting different information (e.g., drawings), flash cards, web articles, blogs and different apps. Other examples of digital amenities include a supermarket providing recipes on how to cook butternut squash; a kitchen appliance store offering tutorial on how to fix a broken dishwasher; a hardware store giving names of local trusted contractors; and a clothing store giving suggestions to a female shopper on what styles of clothing would complement a petit size woman.

A number of embodiments have been described regarding a user. The user can be a person who is a customer of the store. In another embodiment, the user can be a client of the store, or a paying guest of the store.

A number of embodiments have been described for stores or shops. Such establishments can provide services/products to customers and have physical presence. They can have small footprints, such as kiosks (e.g. a kiosk in a mall) or stands (e.g. a hot dog stands on a street). In the example of a kiosk or a small mobile retailer such as a hot dog stand being a store, in one embodiment, its ENAP could be the center of the store. The perimeter of the store could be wireless coverage area of the ENAP. This wireless coverage area can be set by the signal and/or power strength of the ENAP. The coverage area can be set by the business. It can be just a few feet, ten ft or so, or a few tens of ft from the ENAP.

A store can have footprints larger than a hot dog stand, such as restaurants, local boutiques, salons (e.g. hair salons, beauty salons), shops (e.g. specialty shops), entertainment centers, community centers, lounges, bars, clinics, small hotels, airplanes, trains, buses, ferries or cruises; and even larger footprints, such as a chain of stores or restaurants (e.g. franchised stores), shopping malls, business plazas, hospitals, resorts, airports or multi-tenants buildings, such as apartment complex. Also, in one embodiment, a store does not have to be absolutely fixed all the time at a location, relative to the user. For example, a store can be a food truck or a mobile venue that sells food.

A number of embodiments have been described regarding an ENAP at a store. In one embodiment, an ENAP is at a user's home. For example, a store can offer an ENAP to a customer to allow the customer to install the ENAP at home. Subsequently, the customer can access the store's digital amenities from home via the ENAP. In one embodiment, a home or a person's house can be considered a store.

In one embodiment, a store can be a physical school, such as an elementary school. Specific contents can be preloaded into an ENAP before a class starts. The content can be classroom and/or teacher dependent. In another embodiment, the content can also be time or schedule dependent. For example, a student is assigned to a specific classroom with a specific teacher. In that classroom, there can be the ENAP with contents preloaded for that teacher in that classroom. A different class can have different contents preloaded for the student. The preloading can be done wirelessly, via the Internet. The school could have a campus network to assist in the preloading.

The school can preload grade-level contents into the ENAP. The contents can be based on, for example, standard syllabus of the State/country or school district. The contents can include the school syllabus, with learning materials in modules arranged in a hierarchical format based on the syllabus.

Teachers or other school personnel can enhance the contents. Such enhancement can be done before the start of the class, such as before the start of a school year, or before the start of a class on the next day.

Before class, the teacher can update the learning or teaching plan for the class to generate a class-specific learning plan. This can be based on the school's preloaded content. In another example, the update can be for individual student in the class to generate a student-specific learning plan. Assuming that the ENAP includes the student's information such as the student's learning progress, the teacher can access the student's learning progress from the ENAP. Then the teacher can update the student's learning plan to tailor the plan for the student. All these updates can be done remotely even when the teacher is not at school. The teacher can be at home preparing for the class. The teacher can remotely download different contents to the ENAP, such as applications, videos, animations, simulations, music, animated demonstrations, class libraries, ebooks, assignment, other presentations, etc.

During class, students in a classroom, or some of the students in the classroom, can be allowed to work in a self-guided manner using their computing devices via the ENAP. This can be during their quiet reading time, assignment time etc. In one embodiment, the ENAP allows the students to access the pre-loaded contents, but does not allow the students to freely access or roam the web. In another embodiment, students are allowed to access the Internet or one or more specific website/webpage. This access can be guided by the pre-loaded contents in the ENAP and/or by the teacher.

There can be different approaches to guide or control access to the Internet. For example, the ENAP can require a key before one can access the Internet, and the pre-loaded content can provide the key. In another approach, the teacher's computing device is connected to the ENAP, and the ENAP asks the teacher's device for authorization to access the Internet. Instead of asking for authorization, the ENAP can get the key from the teacher's device. Note that a student may only be allowed to access a specific website. This can be done, for example, with the key including the url of the specific website, or the teacher could authorize the url of the specific web-site's to the ENAP.

The ENAP can provide individually-tailored contents to a student. The tailoring can be based on the preloaded individual learning plan. In another embodiment, the ENAP intelligently tailors learning materials dynamically generated for or provided to the student. This can be done, for example, via assessing applications in the ENAP that can assess the student's strengths and weaknesses. The assessment can be performed as the student progresses through the materials at the ENAP. The assessment can compare the student to other students in the same class, in other class(es) and/or in other school(s). For example, there can be different types of individual tailoring, such as different spelling lists, different reading lists, different sequences of the materials to be read (students may get same list but different order to read), different math exercises, different assignments tailored for different levels of difficulties, (such as reading levels, math levels, and music instrument levels), different speech learning plans, and different role rotation plans for group assignments/projects.

To illustrate, individually-tailored contents can be interactive contents that extend across many periods, such as throughout a term. Students can be learning the subject a step at a time across a relatively long duration of time. For example, the contents can be historical wars/battles, science lab experiments, literature readings, or math learning. The contents can include videos and simulations. Then based on a student's behavior, progress and achievements, an ENAP and/or a teacher can constantly update the individualized learning plan for the student(s).

As another illustration of individually-tailored materials, the learning contents can be formatted as an augmented reality game, based on, for example, virtual reality, such as Second Life. The game can include a digital teaching aid to individually help students learn more complicated subjects, piece by piece, one step at a time. For example, a student is working on a simulated science experiment in virtual reality, and performs an incorrect step in the experiment. The digital teaching aid can be a voice at the background incrementally guiding the student back to the right procedure. The audio content may be generated dynamically and in real time, for example, based on a set of rules. As an example, one rule can be, "If the result of step x is y, generate the audio output of z." A second rule can be, "If the result of step x is y and the student profile is w, generate the audio output of z." In this second rule, the audio output z also depends on certain characteristics of the student. To illustrate, if the student is strong in the subject, the audio guidance provided can simply be the right step. However, if the student is weak in the subject, the audio guidance provided to the student can be more fundamental, such as including not just the right step, but also explanation on the concept behind the experiment.

Such student-tailored dynamically generated assistance with the ability to continually and individually interact with a student can be very helpful, particularly when the student is working on a more complicated subject. In one example, the ENAP includes the functionalities of a typical interactive game server. In one embodiment, such dynamic assistance is applied to non-virtual reality content or other types of contents.

The ENAP can allow the student to work on class assignments individually. In another embodiment, the ENAP can allow a number of students to work as a group on an assignment or project. Multiple groups of students within the class can be formed. The ENAP can provide different E-rooms for the different groups. The ENAP can also provide a bulletin board for the students in the class to share information with their classmates. For example, students can share drawings, projects, photos, and homework in their E-rooms and/or the bulletin board.

As a number of students are working via the ENAP, the teacher can monitor their interactions and/or behavior in real time via the ENAP. Or the teacher can walk around the classroom to look over the shoulders of the students to see how they are doing. In another embodiment, interactions with the ENAP are recorded to allow monitoring at a later time.

With some of the students working via the ENAP, the teacher could spend more time to individually work with some other students, such as students that need more help. In another embodiment, the school may be able to cut expenses by reducing the need for teaching assistants, or the number of hours the teacher needs to work. Instead of cutting expenses, the school may be able to increase the number of students in a classroom.

When the class is over or after school, in one embodiment, students can wirelessly access materials from the ENAP, such as to work on assignments, or to access information from the class library. The students need authorization to access the contents in the ENAP, such as by entering a password. Note that the teachers or the school can control the contents accessible by the students. Certain contents may be restricted from access outside the classroom. For example, materials on sex/drug educations can only be accessed in the classroom.

The teacher also can wirelessly access the ENAP to review the students' learning progress and/or to update the students' learning plans. Reports regarding the students can be generated by the ENAP with information tabulated by the teacher or by the ENAP automatically. In one embodiment, parents or guardians of the students are authorized or are granted permission to wirelessly access their corresponding students' performance, progress and/or reports stored in the ENAP.

A number of embodiments have been described regarding an ENAP in a school or in a classroom. Note that there can be more than one ENAP in a school. For example, there can be one ENAP per classroom, one ENAP for a number of neighboring classrooms, one ENAP for the library in the school, one ENAP for a number of students (such as 25 students and 60 students), one ENAP in a gym, or one ENAP in a laboratory. There can also be more than one ENAP in any of the above examples.

In one embodiment, digital amenities can be preloaded into an ENAP for local access at an event. For example, contents can be preloaded into the ENAP by an organizer of the event. The organizer can be the person in charge of the place where the event would be held. Or the ENAP can dynamically preload contents based on recent behavior of a patron to the event.

In one embodiment, the contents preloaded are specific to the event. For example, the event is a planned field trip from a school this afternoon, and the contents are related to the trip. As another example, the event is book-reading in a library with an author. The organizer can be a librarian or a publisher, who can pre-load the specific e-book and other e-books by the same author, books with related subject matter, and video/movies on or related to the book, into the ENAP. The pre-loaded contents can include not just the subject matter regarding the event, but can also include materials related to the subject matter. One assumption is that patrons to the event are interested in the subject matter of the event, implying that the patrons may also be interested in materials related to the subject matter. Examples of other events can be a movie watching event for seniors, a musical session for a dancing party, a video/presentation for a city council, and a neighborhood meeting at a library.

As another example, the event is a conference, which can be held in a hotel or a conference center. Preloaded contents can include conference presentations, author/speaker biographies and related subject matters. For example, the preloaded contents can be preview videos of a show to be held during that evening at the hotel or at a nearby hotel.

In another embodiment, the preloaded content can be tailored to a patron of the event. For example, a patron could be at a similar event put together by the organizer. Based on past interactions/usage/behavior of the patron at the past event, the organizer can preload contents the patron should be interested into the ENAP. To illustrate, the patron accessed NY Times while he was at a prior event. NY Times on the day of the current event are preloaded during pre-dawn hours onto the ENAP. Based on the patron's known interest/recent behavior, related materials can be preloaded also. For example, if the user is interested in health issues (as shown by her past/recent access of health articles), a local health club's discount coupon is preloaded and presented to the patron at the event.

Note that a typical conference can last for more than one day. Then based on the patron's earlier access, the ENAP can preload similar or related information for the patron. For example, on day one of the conference, the patron watched a specific prime time TV show during last break time at the conference. Then, before day two, the ENAP preloads the same prime time TV show broadcasted on day two before the last break time. Then if the patron tries to access the show during the last break time on day two, the accessing speed could be much faster, significantly improving viewing satisfaction. In another approach, before the last break time on day two, after the download, the ENAP can proactively ask whether the patron wants to watch the show.

An organizer of an event may have license only to certain contents. As an example, the organizer does not have the license to preload a specific content into the ENAP. Instead of preloading that content, the ENAP preloads a licensed content (or content the organizer has the license to preload) that is related to the specific content. To illustrate, during day one of a conference, a patron wirelessly accesses through a mobile device and reads Fortune Magazine. The organizer of the event does not have license to preload Fortune, but has license to preload Forbes. Then during the night of day one, Forbes is preloaded into the ENAP. When the patron arrives on day two, the ENAP recommends Forbes to the patron. As another illustration, again the ENAP has preloaded Financial Times based on a prior license agreement, but not Wall Street Journal due to the lack of a prior license. Then patrons at the event can access the preloaded Financial Times from the ENAP with minimal delay. However, a patron accessing the WSJ through the Internet would experience unpredictable delay due to, for example, congestion of the Internet access by other patrons at the event.

Note that other digital amenities can also preload into the ENAP for local access at an event, such as e-newspaper, e-magazine, e-books, video, TV shows, music, and other contents popular to many at that time. In another embodiment, advertising related to the event can be preloaded. The advertising can also be related to a patron's specific interest, which can be based on the patron's past/recent behavior.

A number of embodiments have been described relating to using an ENAP for local access of contents at a school or at an event. In one embodiment, the content can be automatically downloaded to a computing device of a pre-registered user when the user is within the ENAP range. To illustrate, during the beginning of a school year or a semester, a student registers for or is assigned to a class. Assume that the student is using the mobile device that he would be using in class to go to the school's website to register. During registration, the school's website can give the student a student ID. That ID can be automatically downloaded and stored in the device. For example, the website can store the ID in the device's cookie. However, if the student is not using the same mobile device to register, the registration process can suggest the student to add the student ID into the specific mobile device to be used in class. For example, the school can require the student to register his mobile device to be used. The school can ask the student to access the school's website using that mobile device. When the student accesses the website with that device, an application with the student ID from the website can be downloaded into the device. The application can be the device's ENAP client software.

Subsequently, a class roster, including the student ID together with the class schedule for that class, can be downloaded to the ENAP for that class. Throughout the semester, every school day as the student gets into the classroom of that class, the mobile device registers with the ENAP in the classroom. This can happen when the device is in a low power mode, such as a standby mode. For example, the device has multiple processors, including a low-power broadband processor that is constantly monitoring for wireless signals even when the device is in a low-power mode. When the device senses the ENAP's wireless signals, the previously-downloaded application in the device can allow the ENAP to access the student ID stored in the device. If the ENAP recognizes the student ID and determines that the student should be in that class at that time (based on, for example, the schedule and/or class roster in the ENAP), the ENAP can automatically push and activate the application to receive the lecture notes and/or other pre-determined materials for the student on that day into the device. So, even before the student places his backpack onto his desk, the contents may have already been downloaded. Then when the student opens his mobile device, the contents are ready and waiting for the student.

As explained in the above embodiment, a registered student could access class contents when the student is physically close to the ENAP at certain preset time frame. If the student is far away from the ENAP or if the student is not there at the scheduled time of the class, the ENAP does not have to make the contents available to the student. One benefit of such guided access based on location (such as in a classroom) and time (such as during school hour) can be for student safety. With such control, the student would not be allowed to go and roam around the Internet without supervision. Instead, specific contents pre-approved by the school can be automatically provided to the student in class.

In one embodiment, contents loaded into the student's device can be removed from the device under certain conditions, such as at the end of the class, or after the student exits from the classroom. The ENAP can notify the device to remove the content based on, for example, the class schedule or when the device is de-registered. De-registration can occur when the student logs off from the class session, or turns off the device. The student can also be notified of such removal. For example, when the student logs off from the class, the student is notified via the mobile device that the contents would not be accessible and/or would be removed from the device. There can be different pre-determined accessing rules to control accessing the contents in the device. There can also be different pre-determined restriction rules to restrict accessing the contents at, or to remove the contents from, the device.

The above example is for a student. Another example can be for a conference attendee. The process can be similar. To illustrate, the attendee can register her mobile device with the conference and download a conference application onto the device. Then a presentation with related materials can be automatically downloaded to the device of the pre-registered attendee when the attendee is approaching or physically inside the conference room of the presentation.

The following provides another example of how a user consumes digital amenities at a store, which, in this case, is a coffee shop. Judy, the user, goes to a small coffee shop, Aroma Coffee and Amenities. After sitting down, Judy takes out her e-book reading device and connects to the store's WiFi network. Then Judy logs onto the store's website, www.aromaca.com. The website offers a coupon to buy a cup of espresso and to get a free bagel with cream cheese. Judy gets the coupon, enters her table number and places the order with the coupon using her reading device. As a courtesy of the store, the store's website offers a catalogue of magazines for the user to read at the coffee shop. Judy selects Women's Health to read. Ten minutes later, a waiter delivers her coffee and bagel. After she is done and is ready to leave, Judy exits the store's website, which stops her from reading the magazine. Before she exits the store's website, she is offered to subscribe to Women's Health for a year at a 75% discount of the retail price. Judy likes the articles in the magazine and decides to subscribe. After Judy has subscribed to the magazine, Aroma Coffee and Amenities gets a commission from Women's Health. Also, through the reading device, the store keeps track of Judy's order and her subscription. Next time when Judy goes to Aroma Coffee and Amenities with her reading device, the store's webpage is modified to tailor to Judy. For example, when Judy logs onto the store's website, prominently placed on the site is memberships to local sports club, such as a local 24-Hour Fitness, and discounts from local sports stores, and a coupon for the store's muffin.

Different embodiments of the ENAP offer different advantages for the store and its users. Each store at a specific location is typically catered to a specific type of users at that location. An ENAP can offer a way to promote and sell products/services, digital and/or physical, that can be more targeted to the preference and/or other characteristics of the users, which can lead to more sales, higher satisfaction and/or more return users. As to the users, they could get instant gratification based on both the products/services offered by the store, and the additional digital amenities, with the help of the store's ENAP. Since the additional digital amenities can be targeted to the users, the users are typically more satisfied. And since the users are relatively close to the ENAP, bandwidth and latency constraints to access at least the digital amenities in the ENAP can be significantly reduced.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention claimed is:

1. A method by a network apparatus to help a mobile device of a user, when the mobile device is in a store, to access digital amenities of the store via the network apparatus in a local area network of the store, instead of via a computing device not in the store, with a domain name and an IP address of the network apparatus stored in the network apparatus, the method comprising:

connecting wirelessly automatically to the mobile device through the local area network in the store, and connecting to the computing device not in the store at least via the Internet;

receiving a request at least to obtain a domain name for accessing a digital amenity, to the computing device not in the store, and from the mobile device via the local area network, with the request based on an app associated with the store, and with the app stored in the mobile device;

sending the request to the computing device not in the store at least via the Internet;

receiving a response to the request, from the computing device not in the store, with the response including the domain name of the network apparatus;

sending the domain name of the network apparatus to the mobile device at least via the local area network;

receiving a first request for a first digital amenity from the user using the mobile device, based on the app associated with the store in the mobile device and based on the domain name of the network apparatus;

in view of the first digital amenity not in the network apparatus, gaining access to the first digital amenity from the computing device not in the store, and storing the first digital amenity in the network apparatus;

receiving a second request for a second digital amenity from the user using the mobile device, based on the app associated with the store in the mobile device and based on the domain name of the network apparatus;

retrieving the second digital amenity in the network apparatus, in view of the second digital amenity previously stored in the network apparatus, the second digital amenity in the network apparatus being previously received from the computing device not in the store; and sending the retrieved second digital amenity to the mobile device via the local area network.

2. The method as recited in claim 1 further comprising providing wirelessly and automatically to the mobile device through the local area network in the store, another digital amenity in a subsequent visit to the store, with the providing being at least based on the app in the mobile device.

3. The method as recited in claim 1 further comprising deleting the second digital amenity from the network apparatus in view of a lack of access for a duration of time of the second digital amenity from the storage module in the store.

4. The method as recited in claim 1 further comprising assisting the user to have a piece of information to be provided in the network apparatus so that one other user with a mobile device in the store could access the piece of information from the network apparatus.

5. The method as recited in claim 1 further comprising:
accessing a third digital amenity from the computing device not in the store in view of receiving the second request for the second digital amenity; and
storing the third digital amenity in the network apparatus in anticipation of the third digital amenity to be later accessed in the store.

6. The method as recited in claim 5 further comprising recommending the third digital amenity to the user via the mobile device if the mobile device is in the store.

7. The method as recited in claim 1 further comprising requesting the second digital amenity from the computing device not in the store, at least in view of the first request for the first digital amenity, in anticipation of the second digital amenity to be accessed in the store.

8. The method as recited in claim 1,
wherein the network apparatus has an identifying address and the mobile device has a mobile device address, with the request including both addresses, and
wherein the method comprises resolving the domain name of the network apparatus into the IP address of the network apparatus for the mobile device.

9. The method as recited in claim 1, further comprising, with the first digital amenity in the network apparatus, allowing another mobile device in the store to receive the first digital amenity from the network apparatus, without the need for the network apparatus to receive again the first digital amenity from the computing device not in the store.

10. The method as recited in claim 1, wherein the network apparatus is in the store.

11. The method as recited in claim 10, wherein the store operates in a vehicle.

12. The method as recited in claim 10, wherein the vehicle is an airplane.

13. A network apparatus to help digital amenities of a store to be accessed in the store, instead of from a computing device not in the store, by a mobile device of a user, when the mobile device is in the store, the network apparatus comprising:
a network interface configured to at least couple to the mobile device in the store via a local area network in the store, and configured to at least couple to the computing device not in the store, at least via the Internet;
a storage module; and
a computing module, coupled to the network interface and the storage module,
wherein the network apparatus, including software and hardware, is in the local area network of the store,
wherein the network apparatus is configured to store at least a domain name and an IP address of the network apparatus,
wherein the network interface is configured to automatically connect wirelessly to the mobile device through the local area network in the store,
wherein the computing module is configured to receive a request at least to obtain a domain name for accessing a digital amenity, to the computing device not in the store, and from the mobile device via the local area network, with the request based on an app associated with the store, and with the app stored in the mobile device,
wherein the computing module is configured to send the request to the computing device not in the store at least via the Internet,
wherein the computing module is configured to receive a response to the request, from the computing device not in the store, with the response including the domain name of the network apparatus,
wherein the computing module is configured to send the domain name of the network apparatus to the mobile device at least via the local area network,
wherein the computing module is configured to receive a first request for a first digital amenity from the user using the mobile device, based on the app associated with the store in the mobile device and based on the domain name of the network apparatus,
wherein in view of the first digital amenity not in the network apparatus, the computing module is configured to gain access to the first digital amenity from the computing device not in the store, and to store the first digital amenity in the storage module,
wherein the computing module is configured to receive a second request for a second digital amenity from the user using the mobile device, based on the app associated with the store in the mobile device and based on the domain name of the network apparatus, and
wherein the computing module is configured to retrieve the second digital amenity in the storage module and send the retrieved second digital amenity from the storage module to the mobile device via the local area network, in view of the second digital amenity in the storage module, the second digital amenity previously stored in the storage module being previously received from the computing device not in the store.

14. The network apparatus as recited in claim 13,
wherein there is a plurality of categories related to stores, and the store belongs to at least one of the categories, and
wherein the second digital amenity is tailored to the at least one of the categories.

15. The network apparatus as recited in claim 13, wherein the computing module, in view of receiving the second request for the second digital amenity, is configured to access a third digital amenity from the computing device not in the store, to be pre-stored at the storage module in anticipation of the third digital amenity to be later accessed in the store.

16. The network apparatus as recited in claim 13, wherein based on the app in the mobile device, the network apparatus is configured to automatically provide another digital amenity to the mobile device in a subsequent visit to the store.

17. The network apparatus as recited in claim 15, wherein the computing module is configured to delete the third digital amenity from the storage module in view of a lack of access for a duration of time of the third digital amenity from the storage module in the store.

18. The network apparatus as recited in claim 15, wherein both the second and the third digital amenities are tailored to an attribute of the store.

19. The network apparatus as recited in claim 13, wherein the network apparatus has the dimensions approximately of a USB thumb drive.

20. The network apparatus as recited in claim 13, wherein the computing module is configured to assist the user to have a piece of information stored in the network apparatus that at least one other user with a mobile device in the store could access from the network apparatus.

21. The network apparatus as recited in claim 20, wherein the second digital amenity includes a piece of reading materials, and the computing module is configured to link the piece of information to the piece of reading materials.

22. The network apparatus as recited in claim 15, wherein the computing module is configured to send a recommendation to the user to access a fourth digital amenity via the mobile device.

23. The network apparatus as recited in claim 22,
wherein the computing module is configured to send the recommendation to the user to access the fourth digital amenity via the mobile device if the mobile device is in a first location of the store, and
wherein the computing module is configured to send a recommendation to the user to access a fifth digital amenity via the mobile device if the mobile device is in a second location of the store.

24. The network apparatus as recited in claim 13,
wheren the network interface is configured to couple at least wirelessly to the computing device not in the store, which does not belong to the store, to access a first type of digital amenities, and
wherein the network interface is configured to couple at least wirelessly to another computing device, which belongs to the store, but outside the store, to access a second type of digital amenities.

25. The network apparatus as recited in claim 15, wherein the network apparatus is configured to automatically transmit the third digital amenity to the mobile device if the mobile device is in the store subsequently.

26. The network apparatus as recited in claim 13, wherein the local area network is selected from the list including WiFi, Bluetooth, WiMAX, and Ethernet.

27. The network apparatus as recited in claim 13, wherein the network apparatus is configured to request for the second digital amenity from the computing device not in the store, at least in view of the first request for the first digital amenity, in anticipation of the second digital amenity to be accessed in the store.

28. The network apparatus as recited in claim 13, wherein the network apparatus is configured to automatically provide another digital amenity to the mobile device wirelessly, based on the app in the mobile device, if the mobile device is in the store in a subsequent visit.

29. The network apparatus as recited in claim 13,
wherein the computing module is configured to send a recommendation to the user to access a third digital amenity via the mobile device if the mobile device is in a first location of the store, and
wherein the computing module is configured to send a recommendation to the user to access a fourth digital amenity via the mobile device if the mobile device is in a second location of the store.

30. The network apparatus as recited in claim 13, wherein the computing module is configured to allow another mobile device to access the second digital amenity in the storage module, while the mobile device is accessing the second digital amenity in the storage module.

31. The network apparatus as recited in claim 13,
wherein the network apparatus has an identifying address and the mobile device has a mobile device address, with the request including both addresses, and
wherein the network apparatus is configured to resolve the domain name of the network apparatus into the IP address of the network apparatus for the mobile device.

32. The network apparatus as recited in claim 13, wherein with the first digital amenity in the network apparatus, the network apparatus is configured to allow another mobile device in the store to receive the first digital amenity from the network apparatus, without the need for the network apparatus to receive again the first digital amenity from the computing device not in the store.

33. The network apparatus as recited in claim 13, wherein the network apparatus is in the store.

34. The network apparatus as recited in claim 33, wherein the store operates in a vehicle.

35. The network apparatus as recited in claim 34, wherein the vehicle is an airplane.

36. A non-transitory computer readable storage medium comprising a plurality of instructions to at least help a mobile device of a user, when the mobile device is in a store operating in an airplane, to access digital amenities of the store via a network apparatus in the store, instead of via a computing device not in the store, with a domain name and an IP address of the network apparatus stored in the network apparatus, the plurality of instructions, when executed by at least a processor in the network apparatus, result in the network apparatus:
connecting wirelessly automatically to the mobile device through the local area network in the store, and connecting to the computing device not in the store at least via the Internet;
receiving a request at least to obtain a domain name for accessing a digital amenity, to the computing device not in the store, and from the mobile device via the local area network, with the request based on an app associated with the store, and with the app stored in the mobile device;
sending the request to the computing device not in the store at least via the Internet;

receiving a response to the request, from the computing device not in the store, with the response including the domain name of the network apparatus;

sending the domain name of the network apparatus to the mobile device at least via the local area network;

receiving a first request for a first digital amenity from the user using the mobile device, based on the app associated with the store in the mobile device and based on the domain name of the network apparatus;

in view of the first digital amenity not in the network apparatus, gaining access to the first digital amenity from the computing device not in the store, and storing the first digital amenity in the network apparatus;

receiving a second request for a second digital amenity from the user using the mobile device, based on the app associated with the store in the mobile device and based on the domain name of the network apparatus;

retrieving the second digital amenity in the network apparatus, in view of the second digital amenity previously stored in the network apparatus, the second digital amenity in the network apparatus being previously received from the computing device not in the store; and sending the retrieved second digital amenity to the mobile device via the local area network.

* * * * *

UNITED STATES PATENT AND TRADEMARK OFFICE
CERTIFICATE OF CORRECTION

PATENT NO. : 10,666,732 B2
APPLICATION NO. : 13/405366
DATED : May 26, 2020
INVENTOR(S) : Ho et al.

Page 1 of 1

It is certified that error appears in the above-identified patent and that said Letters Patent is hereby corrected as shown below:

In the Specification

Column 5, Line 14: "wife" should be --wifi--

In the Claims

Column 24, Line 3 (Claim 12, Line 1): "claim 10" should be --claim 11--

Column 25, Line 53 (Claim 24, Line 2): "wheren" should be --wherein--

Signed and Sealed this
Eighteenth Day of August, 2020

Andrei Iancu
*Director of the United States Patent and Trademark Office*